(12) United States Patent
Jennings

(10) Patent No.: US 9,349,138 B2
(45) Date of Patent: May 24, 2016

(54) SYSTEM AND METHOD FOR STREAMING MEDIA

(75) Inventor: Charles A. Jennings, Kansas City, MO (US)

(73) Assignee: SITO Mobile R&D IP, LLC, Jersey City, NJ (US)

( * ) Notice: Subject to any disclaimer, the term of this patent is extended or adjusted under 35 U.S.C. 154(b) by 2016 days.

(21) Appl. No.: 11/177,676

(22) Filed: Jul. 8, 2005

(65) Prior Publication Data

US 2006/0002418 A1    Jan. 5, 2006

Related U.S. Application Data

(60) Division of application No. 09/838,993, filed on Apr. 20, 2001, now Pat. No. 7,054,949, which is a continuation-in-part of application No. 09/766,519, filed on Jan. 19, 2001, now abandoned.

(51) Int. Cl.
*G06F 15/16* (2006.01)
*G06Q 30/02* (2012.01)
(Continued)

(52) U.S. Cl.
CPC ........ *G06Q 30/0274* (2013.01); *H04L 12/5695* (2013.01); *H04L 29/06* (2013.01); *H04L 47/2416* (2013.01); *H04L 47/724* (2013.01);
(Continued)

(58) Field of Classification Search
CPC .............. H04L 47/826; H04L 65/4092; H04L 29/06027
USPC ........................................................ 709/231
See application file for complete search history.

(56) References Cited

U.S. PATENT DOCUMENTS 4,939,719 A    7/1990    Bakka
5,361,254 A    11/1994   Storck et al.
(Continued)

OTHER PUBLICATIONS

International Search Report, dated Aug. 20, 2002, PCT/US02/01368, System and Method for Streaming Media, 6 pages.
(Continued)

*Primary Examiner* — Douglas Blair
(74) *Attorney, Agent, or Firm* — Polsinelli PC; James M. Stipek

(57) ABSTRACT

The system and method for streaming media to a viewer and managing the media comprises and an enhanced service routing processor (ESRP), a real time switch management system (RTSMS), a name routing processor (NRP), and a managed media switch (MMS). The system and method operate with a reservation server. The ESRP receives media from an owner, manages the media according to media rules and order rules defined by the owner, and distributes the media to one or more switches, such as the MMS, according to the media rules and the order rules. The RTSMS is configured to receive the media rules and to receive a viewer's media request via the reservation server. The RTSMS processes the media request according to the media rules and builds a reservation for the requested media. The RTSMS generates the reservation to the viewer and to the NRP. The NRP receives the reservation data from the viewer and from the RTSMS. The NRP processes the reservation data and locates an MMS that can stream the media to the viewer. The NRP transmits the IP address of the MMS to the viewer and transmits the reservation data to the MMS. The viewer initiates a session or connection with the MMS using the reservation number. If the reservation data from the viewer matches the reservation data from the NRP, the MMS streams the media to the viewer.

20 Claims, 8 Drawing Sheets

(51) Int. Cl.
- *H04L 12/54* (2013.01)
- *H04L 29/06* (2006.01)
- *H04L 12/853* (2013.01)
- *H04L 12/913* (2013.01)
- *H04L 12/911* (2013.01)
- *H04L 12/927* (2013.01)

(52) U.S. Cl.
CPC ............ *H04L 47/781* (2013.01); *H04L 47/801* (2013.01); *H04L 47/806* (2013.01); *H04L 47/808* (2013.01); *H04L 47/822* (2013.01); *H04L 47/826* (2013.01); *H04L 65/4092* (2013.01); *H04L 29/06027* (2013.01)

(56) References Cited

U.S. PATENT DOCUMENTS

| | | | | |
|---|---|---|---|---|
| 5,659,542 | A | 8/1997 | Bell et al. | |
| 5,664,196 | A * | 9/1997 | Hecker | 710/200 |
| 5,684,799 | A | 11/1997 | Bigham et al. | |
| 5,742,840 | A | 4/1998 | Hansen et al. | |
| 5,756,280 | A | 5/1998 | Soora et al. | |
| 5,777,994 | A | 7/1998 | Takihiro et al. | |
| 5,778,187 | A | 7/1998 | Monteiro et al. | |
| 5,784,449 | A | 7/1998 | Ardon | |
| 5,787,253 | A | 7/1998 | McCreery et al. | |
| 5,805,821 | A | 9/1998 | Saxena et al. | |
| 5,856,974 | A | 1/1999 | Gervais et al. | |
| 5,862,339 | A | 1/1999 | Bonnaure et al. | |
| 5,867,495 | A | 2/1999 | Elliott et al. | |
| 5,867,665 | A | 2/1999 | Butman et al. | |
| 5,867,799 | A | 2/1999 | Lang et al. | |
| 5,870,546 | A | 2/1999 | Kirsch | |
| 5,892,913 | A | 4/1999 | Adiga et al. | |
| 5,892,915 | A | 4/1999 | Duso et al. | |
| 5,905,872 | A | 5/1999 | DeSimone et al. | |
| 5,910,954 | A | 6/1999 | Bronstein et al. | |
| 5,914,953 | A | 6/1999 | Krause et al. | |
| 5,928,331 | A | 7/1999 | Bushmitch | |
| 5,930,493 | A | 7/1999 | Ottesen et al. | |
| 5,933,835 | A | 8/1999 | Adams et al. | |
| 5,940,369 | A | 8/1999 | Bhagavath et al. | |
| 5,948,061 | A | 9/1999 | Merriman et al. | |
| 5,958,016 | A | 9/1999 | Chang et al. | |
| 5,959,994 | A | 9/1999 | Boggs et al. | |
| 5,982,891 | A | 11/1999 | Ginter et al. | |
| 5,983,005 | A | 11/1999 | Monteiro et al. | |
| 5,991,306 | A | 11/1999 | Burns et al. | |
| 5,999,179 | A | 12/1999 | Kekic et al. | |
| 6,005,858 | A | 12/1999 | Fallon et al. | |
| 6,006,264 | A | 12/1999 | Colby et al. | |
| 6,009,410 | A | 12/1999 | LeMole et al. | |
| 6,012,098 | A | 1/2000 | Bayeh et al. | |
| 6,014,384 | A | 1/2000 | Weberhofer | |
| 6,014,706 | A | 1/2000 | Cannon et al. | |
| 6,023,730 | A | 2/2000 | Tani | |
| 6,026,430 | A | 2/2000 | Butman et al. | |
| 6,029,175 | A | 2/2000 | Chow et al. | |
| 6,029,200 | A | 2/2000 | Beckerman et al. | |
| 6,067,542 | A | 5/2000 | Cariño, Jr. | |
| 6,067,558 | A | 5/2000 | Wendt et al. | |
| 6,085,224 | A | 7/2000 | Wagner | |
| 6,085,235 | A | 7/2000 | Clarke, Jr. et al. | |
| 6,091,777 | A | 7/2000 | Guetz et al. | |
| 6,098,094 | A | 8/2000 | Barnhouse et al. | |
| 6,098,108 | A | 8/2000 | Sridhar et al. | |
| 6,108,782 | A | 8/2000 | Fletcher et al. | |
| 6,112,236 | A | 8/2000 | Dollin et al. | |
| 6,112,239 | A | 8/2000 | Kenner et al. | |
| 6,119,163 | A | 9/2000 | Monteiro et al. | |
| 6,131,091 | A | 10/2000 | Light | |
| 6,134,596 | A | 10/2000 | Bolosky et al. | |
| 6,138,163 | A | 10/2000 | Nam et al. | |
| 6,144,657 | A | 11/2000 | Baehr | |
| 6,151,319 | A | 11/2000 | Dommety et al. | |
| 6,363,434 | B1 * | 3/2002 | Eytchison | 719/313 |
| 6,385,596 | B1 * | 5/2002 | Wiser et al. | 705/51 |
| 6,510,556 | B1 | 1/2003 | Kusaba et al. | |
| 6,529,950 | B1 * | 3/2003 | Lumelsky et al. | 709/218 |
| 6,732,365 | B2 * | 5/2004 | Belknap et al. | 719/328 |
| 6,751,221 | B1 | 6/2004 | Saito et al. | |
| 6,788,696 | B2 | 9/2004 | Allan et al. | |
| 6,798,777 | B1 | 9/2004 | Ferguson et al. | |
| 6,886,042 | B1 | 4/2005 | Watahiki et al. | |
| 7,565,427 | B2 * | 7/2009 | Brelin | 709/224 |
| 2002/0059120 | A1 * | 5/2002 | Milton | 705/28 |
| 2003/0070001 | A1 * | 4/2003 | Belknap et al. | 709/321 |
| 2003/0110503 | A1 | 6/2003 | Perkes | |

OTHER PUBLICATIONS

European Patent Office Official Communication, dated Jan. 13, 2005, Application No. 02 704 163.1-1525, System and Method for Streaming Media, 5 pages.

European Patent Office Official Communication, dated Jan. 9, 2006, Application No. 02 704 163.1-1525, System and Method for Streaming Media, 4 pages.

European Patent Office Official Communication, dated Jul. 11, 2007, Application No. 02 704 163.1-1525, System and Method for Streaming Media, 3 pages.

European Patent Office Official Communication, dated Sep. 21, 2007, Application No. 02 704 163.1-1525, System and Method for Streaming Media, 3 pages.

Wolf, L.C. et al: "Issues of Reserving Resources in Advance," Fifth International Workshop on Network and Operating System Support for Digital Audio and Video, Proceedings, Durham, NH, USA, Apr. 19-21, 1995, pp. 27-37.

Schill, Alexander et al: "Resource Reservation in Advance in Heterogeneous Networks with Partial ATM Infrastructures,"—Infocom May 1997, pp. 611-618.

* cited by examiner

SYSTEM AND METHOD FOR STREAMING MEDIA

RELATED APPLICATION

This application is a divisional application of U.S. patent application Ser. No. 09/838,993, filed Apr. 20, 2001, issued as U.S. Pat. No. 7,054,949 on May 30, 2006, entitled System and Method for Streaming Media, which is a continuation-in-part application of U.S. patent application Ser. No. 09/766,519, filed Jan. 19, 2001, now abandoned, entitled System and Method for Streaming Media, and is related to co-pending, co-filed U.S. patent application Ser. No. 11/177,843, issued as U.S. Pat. No. 7,689,706 on Mar. 20, 2010, entitled System and Method for Streaming Media, and Ser. No. 11/177,677, issued as U.S. Pat. No. 8,015,307 on Sep. 6, 2011, entitled System and Method for Streaming Media, all of which are hereby incorporated by reference into this application.

FIELD OF THE INVENTION

The present invention is related to the fields of management and administration of a media streaming distribution and viewer session management.

BACKGROUND OF THE INVENTION

Real time transport of audio, video, and other data commonly referred to as "media" may be manipulated and rendered using computers and/or digital appliances, such as a set top box. A digital appliance is a horizontal product based on electronics technology that performs functions and uses a computer and/or a telecommunication network or other computer network to access, retrieve, interact with, report, and/or handle media or other information.

As computers and computer based appliances gain in popularity, the demand for digital media streaming services also increases. This occurs because digital media streaming can be used to create enhanced consumer and business services. For example, a manufacturer of a refrigerator may install a digital appliance that connects the refrigerator's digital appliance to the Internet. A consumer can use the digital appliance to receive digital audio/video explaining how to prepare a favorite recipe.

The digital appliances and other computers can use real time media streaming services to render media while it is streamed from the media's server computer. Real time media streaming often is preferred over pure downloading since media streaming permits a consumer to view video and/or hear the audio shortly after it is requested instead of waiting for a delayed download of the complete media and a subsequent playing of the media by the digital appliance.

Real time media streaming is difficult to implement on diverse networks, such as the internet, corporate private networks, corporate intranets, and other packet based networking solutions. This is because real-time media applications typically are resource intensive and lack sufficient state control models to ensure proper quality of service. Enhanced media streaming services generally compound the difficulties because multiple digital media streams are transmitted instead of a single digital media stream. In these instances, current technologies treat each digital media stream as an individual session with little or no association to the viewer. Moreover, existing digital media streaming devices focus on the technical transmission delivery of media, and place little control over the viewer management and media content management.

As a result, companies wishing to use digital streaming services currently face difficult tasks of managing diverse sets of equipment and software in order to provide consumers services that meet their needs. In addition, the ability to accurately track and bill consumers to whom services are provided is lacking. An improved system and method are needed to focus on viewer and media content management while simultaneously delivering a media stream having high quality. The present system and method meet those needs.

SUMMARY OF THE INVENTION

The present invention is directed to a system for streaming media comprising a media switch, a routing processor, and a management system. The media switch is configured to receive reservation data for a request for media and to receive a reservation identification. The media switch processes the reservation identification and the reservation data to determine if the reservation identification is valid, and, if valid, streams the media for the request. The routing processor is configured to receive the reservation data, to determine if the media switch can stream media for the request, and to transmit the reservation data to the media switch if the media switch is able, at least initially, to stream media for the request. The management system is configured to receive the request for media, to build a reservation having the reservation data for the request, and to transmit the reservation data to the routing processor.

The present invention also is directed to a system for streaming media to a viewer for a request for media comprising a media switch, a routing processor, and a management system. The media switch is configured to receive from the viewer at a media switch address a reservation identification and a presentation identification. The media switch also receives reservation data having a valid reservation identification. The media switch validates the reservation identification using the valid reservation identification, and, if validated, streams to the viewer at least some media for a presentation identified by the presentation identification. The routing processor is configured to receive for a routing processor identification a presentation identification and a reservation identification. The routing processor receives the reservation data and uses the presentation identification to determine if the media switch is configured to stream media for the presentation. If so configured, the routing processor transmits the reservation data to the media switch and transmits the media switch address to the viewer. The management system is configured to receive the request for media and to build a reservation having the reservation identification, the routing processor identification, and the presentation identification. The management system transmits the reservation to the viewer and transmits the reservation data to the routing processor.

Also, the present invention is directed to a system for distributing media comprising a service processor configured to receive media and at least one media rule indicating how the media is to be distributed and to distribute the media according to the media rule. The system further comprises a media switch configured to receive the media distributed by the service processor according to the media rule and to stream the media when a valid reservation identification is received.

In addition, the present invention is directed to a system for processing a media request comprising a service processor configured to receive media, at least one media rule indicating how the media is to be distributed, and at least one order rule indicating settlement for streamed media. The service processor is configured to distribute the media according to the media rule and to transmit a media identification for the media and the order rule. A management system is configured to receive the media identification and the order rule, to receive the request for the media, and to build and transmit a reservation having a reservation identification and the media identification. The management system receives at least one information block identifying the reservation identification and streaming for at least some of the media and processes the information block with the reservation identification and according to the order rule to generate a settlement record.

The present invention further is directed to a method for streaming media. The method comprises receiving a request for media and building in response thereto a reservation having a reservation identification for the request. The method includes receiving reservation data comprising a valid reservation identification and a media identification at a routing processor identification and determining if a media switch is configured to stream media for the request. The reservation data is transmitted to the media switch if the media switch is configured, at least initially, to stream media for the request. The reservation data for the request for media and the reservation identification are received. The reservation identification and the reservation data are processed to determine if the reservation identification is valid. The media for the request is streamed if the reservation identification is valid.

Further, the present invention is directed to a method for streaming media to a viewer for a request for media comprising receiving the request for media and building a reservation having a reservation identification, a routing processor identification, and a presentation identification. The reservation is transmitted to the viewer and the reservation data is transmitted to the routing processor. A presentation identification and a reservation identification are received for a routing processor identification, and the reservation data is received. The presentation identification is used to determine if a media switch is configured to stream media for the presentation, and, if so configured, the reservation data is transmitted to the media switch and transmitting the media switch address to the viewer. A reservation identification and a presentation identification are received from the viewer at a media switch address. Reservation data having a valid reservation identification is received, and the reservation identification is validated using the valid reservation identification. If validated, at least some media for the presentation identified by the presentation identification is streamed to the viewer.

Also, the present invention is directed to a system for distributing media comprising a service processor configured to receive media and at least one media rule indicating how the media is to be distributed and to distribute the media according to the media rule. The system further comprises a media switch configured to receive the media distributed by the service processor according to the media rule and to stream the media when a valid reservation identification is received.

In addition, the present invention is directed to a system for processing a media request comprising a service processor configured to receive media, at least one media rule indicating how the media is to be distributed, and at least one order rule indicating settlement for streamed media. The service processor is configured to distribute the media according to the media rule and to transmit a media identification for the media and the order rule. A management system is configured to receive the media identification and the order rule, to receive the request for the media, and to build and transmit a reservation having a reservation identification and the media identification. The management system receives at least one information block identifying the reservation identification and streaming for at least some of the media and processes the information block with the reservation identification and according to the order rule to generate a settlement record.

Moreover, the present invention is directed to a method for distributing media comprising receiving media and at least one media rule indicating how the media is to be distributed and distributing the media according to the media rule. The method includes receiving the media distributed according to the media rule and streaming the media when a valid reservation identification is received.

The present invention further is directed to a method for processing a media request comprising receiving media, at least one media rule indicating how the media is to be distributed, and at least one order rule indicating settlement for streamed media. The media is distributed according to the media rule, and a media identification is transmitted for the media and the order rule. The method includes receiving the media identification and the order rule and receiving the request for the media, building and transmitting a reservation having a reservation identification and the media identification. At least one information block identifying the reservation identification and streaming is received for at least some of the media. The information block is processed with the reservation identification and according to the order rule to generate a settlement record.

The present invention also comprises combinations and sub-combinations of the above. In addition, the present invention is directed to variations, modifications, and additions of the above.

DETAILED DESCRIPTION

Figure 1:
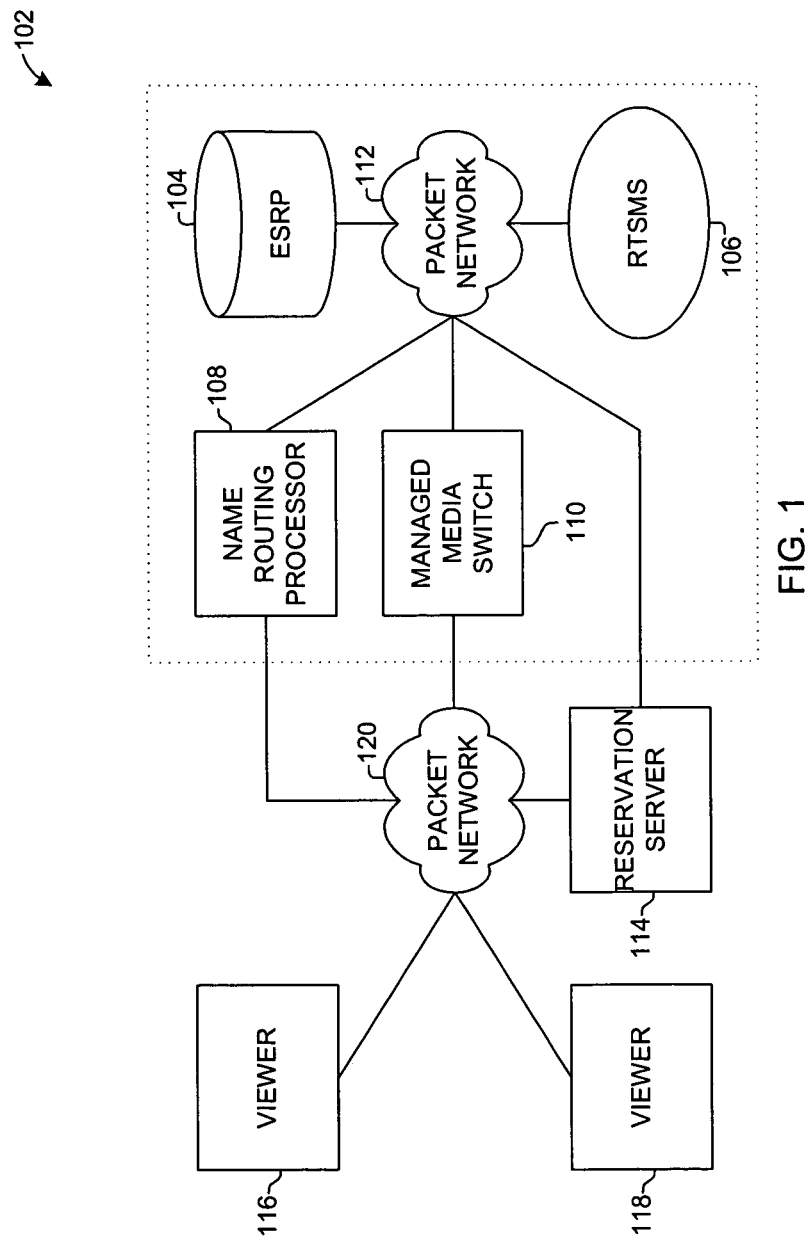
FIG. 1 is a block diagram of a streaming system in accordance with an embodiment of the present invention.

Media streaming, both live and on-demand, provides the optimal environment for viewers to experience multimedia by establishing a logical, one-to-one connection between the media and the audience (a "session"). This enables a rich media, interactive experience and is the foundation for a reliable streaming service platform. Media may include audio, video, and other data. Media may include one or more media clips, a part of a media clip, a presentation as defined below, or part of a presentation. A session may include an internet protocol session and/or a broadband connection. For simplicity, the word session may be used in some instances to mean only an internet protocol session, only a broadband connection, or both, depending on verbiage.

The system of the present invention controls the distribution of streaming media through enhanced communications between communication devices coupled over disparate packet networks, such as the Internet, intranets, virtual private networks, cable systems, frame relay networks, asynchronous transfer mode (ATM) networks, and/or satellite networks. The present invention implements control features, such as real time routing of a request for media service, enforcement of media owner's rights and distribution criteria, real time audience event reporting, and session detail accounting and traceability.

The system of the present invention uses a reservation identification to track media streaming throughout the network. A reservation identification, such as a reservation number, is assigned to a request for media. All communication devices in the network use the reservation identification to provide services for the media. Records later are produced and collated with the reservation identification. This enables the system to provide media from multiple sources, track the provision of media from multiple sources, and generate records and billing that accurately depict the media streaming service. This is an advance over prior systems.

The system of the present invention uses a reservation state model ("state model"). The state model tracks the progress of a viewer request across several different devices and processes to enable the viewer to receive a quality presentation of media. The state model allows a data collection process to occur from the time a request for media is processed and a reservation for the request is generated through and after the time the requested media is streamed to the viewer.

The state model enables dynamic routing of media requests from the viewer, and it monitors when the viewer has suspended the viewing session. The monitoring, recordation, and use of the reservation state model and the state changes thereof are a significant advance over existing approaches that are limited to monitoring a state for only a single media server to a single viewer for a single media clip. The prior approaches cannot collect information prior to a session being established, and this can represent a significant security risk in addition to significantly limiting the ability to provide media from a single device.

However, the present system is not limited to obtaining information only after the session or connection begins. Contrarily, the present system can obtain and gather information for a state prior to, during, and after a session or a connection. For example, a viewer wishing to participate in a video conference may enter the conference code at the time the viewer makes the reservation. The viewer requesting the reservation starts the state model on the switch management system of the present invention. The viewer may be asked to enter a conference code for the reservation which is processed to determine its validity. The reservation would then pass to the routing processor system where the state model completes the routing of the request.

The state model monitors the progress of selecting the right switch to process the event. If no switch resources are available, the state model may choose to queue the reservation until a resource becomes available. Once the routing processor determines to which switch to send the viewer request, the state model awaits the viewer session or connection. When the viewer connects, the viewer may then be asked to enter a second authorization code at the time the media is being retrieved. This second authorization code may be used to identify the person as the chair person, a participant, what company they represent, or other data relevant to the reservation. When the media for the reservation is streaming, the state model identifies the reservation in an active state. If the viewer pauses the conference, the session is suspended until a request to be reconnected is received. Once the viewer tears down the session, the resources are returned to their idle states.

As can be seen from the above example, the state model of the present invention tracks states throughout a reservation and streaming process over multiple devices. In addition, each such device retains a state model for the events and states within that device. This reservation state model enables multiple devices to be used to provide media, enables multiple devices to be substituted in the event of an error or alarm, and enables states and streaming events and records to be reconciled with each other to identify a complete streaming event.

A media stream may comprise signaling that can be transmitted in-band in a streaming session or out of band in a signaling session. The signaling may comprise a client's information, such as a digital media player type, the desired data communication rate, whether the media stream is to be transported over a broadband connection or in-band, and/or whether the media stream is to be communicated over a private network link. Stream signaling comprises information that facilitates the digital stream processing. Stream signaling may comprise, for example, information describing the viewer digital media player software version, the desired content reference, and the desired quality of service. Stream signaling is accomplished through various standard protocols such as real time streaming protocol (RTSP), real time protocol (RTP), session initiation protocol (SIP), and the International Telecommunications Union (ITU) H.323 series protocols.

Signaling and signaling sessions are used to transport reservation requests and other signaling messages. The term "signaling" when used with "session" herein means the transmission and/or reception of signaling to or from a viewer or a device in the streaming system. Signaling may include a viewer's choices of content selection, desired communication speed, desired digital media format, and statistical data on one or more simultaneous streaming sessions. A signaling session typically is associated with out-of-band communications, such as with a logical virtual circuit connection, but can be associated with logical in-band sessions. Virtual private networks (VPNs) may be used to transport stream signaling and control information for a signaling session. VPNs can include the Internet, intranets, local area networks (LANs), wide area networks (WANs), frame relay networks, asynchronous transfer mode (ATM) networks, or other networks.

Streaming sessions are used to transport media, other media player process communications, including in-band signaling, and other device information, to and from a viewer and other communication devices. The term "streaming session" as used herein means the transmission of media over a packet based network to a viewer or to another communication device. For example, a streaming session can carry media to a set top box for display on one or more televisions or to a media player associated with a web browser.

The system is configured to stream multiple sessions simultaneously and/or in parallel. For example, a hearing impaired person using a viewer may request for a news item and request for a signing interpreter. In this instance, two steaming sessions exist, and they both operate on the viewer.

The first session is the news clip, and the second session is another person hand signing what the news clip announcer is stating.

There are multiple uses for parallelism in streaming media. Media can be streamed with a different, customized sound track, such as a language preference. This typically is synchronized.

Also, different media can be streamed in parallel. This can occur with business presentations and may be an option with the hand signing example above. These typically are synchronized.

Different videos that are semi-synchronized may be streamed so that a viewer can back up, repeat, or skip forward on two or more videos independently. For example, a viewer may have a talking head in a business presentation, but the video presentation of a collateral video/audio material may occur in a different stream. The viewers would be allowed to backup and review previous collateral video material without disrupting the rest of the presentation.

In addition, independent videos may be streamed from a source. For example, a source may customize a presentation to be used in a world news feed and a financial news feed.

FIG. 1 depicts an exemplary embodiment of a streaming system of the present invention. The streaming system 102 of FIG. 1 comprises a service processor, a management system, a routing processor, and a media switch, such as an enhanced service routing processor (ESRP) 104, a real time switch management system (RTSMS) 106, a name routing processor (NRP) 108, and a managed media switch (MMS) 110, respectively, each communicating through a packet network 112. A reservation system, such as a reservation server 114, may communicate with the RTSMS 106 via the packet network 112, and one or more viewers 116 and 118 may communicate with the NRP 108, the MMS 110, and/or the reservation server 114 via a packet network 120.

The ESRP 104 enables media owners to place the media on the ESRP for distribution to various switches, such as to various multimedia switches in the streaming system 102. The ESRP 104 allows each media owner to create a list of media, including one or more different types of media or one or more different media clips, and to create media rules to determine the sequence in which the media clips are to be streamed, where the media clips are to be placed, and, in some instances, to whom the media clips can be transmitted.

Media rules may include age restrictions, restrictions for geographic locations, time restrictions, and other media rules. The media list and the media rules that govern the transmission of the media list are called a presentation. The presentation includes the media name(s), the media rules provided by the media owners, and the network distribution rules provided by the packet network supplier. Network distribution rules are defined by a network operator to manage capacity, load, bandwidth, switch and other resource events, including resources for sessions and connections. For example, a presentation can be configured to stream ten minutes of a sitcom based media, insert an advertisement, and then return to the sitcom based media show and may be restricted to 30 viewing frames per second by the network supplier.

The ESRP 104 also allows a media owner and/or a publishing agent of the owner (hereafter "media owner") to generate rules that define who will be billed or credited when media is transmitted to a viewer or another device and the terms of the bill or credit. For example, a media owner may have a contract with a service provider, and the service provider will share in the revenue generated by viewers viewing the content. Alternately, the media owner may have to pay the service provider for use of an amount of bandwidth when the media is transmitted. In addition, part of the media sent to a viewer may include advertisements, and the media owner can define a rule to bill the advertising entity a dollar amount each time the media is transmitted.

The rules also can identify any restrictions or other customizations, such as geographic or age restrictions, preferred language, or substitutions on the streaming of the presentations. For example, if a football game is a presentation, the game may be blocked from a specific region when the streaming is free, but not blocked if the game is part of a subscription or Pay Per View service. The media owner would generate two or more different orders for the same presentation, and a viewer 116 or 118 would be blocked or not blocked from the presentation depending on which order the viewer was attempting to use. The rules that govern entities, methods, and terms for billing or crediting based on a transmitted media presentation, and any other settlement rules governing the presentation are known as an order.

The ESRP 104 publishes presentations when the presentations and the orders for the presentations are complete. Publishing is the act of making a presentation available on the streaming network 102 for distribution to one or more viewers via a switch, such as the MMS 110. Thus, when a presentation and its order are complete, the ESRP 104 may transmit the media identified in the presentation to one or more switches, such as the MMS 110, according to one or more media rules so that the presentation is available to be streamed to a viewer. The ESRP 104 also publishes the presentations, including a presentation identification, a media list for the presentation, and the media rules for the presentation, to the RTSMS 106

One or more ESRP devices may exist in the streaming system 102. One ESRP is depicted in FIG. 1 for clarity.

The RTSMS 106 accepts presentations and their respective orders from the ESRP 104 when the presentations are published. The RTSMS 106 determines the switches or other communication devices on which the presentations reside. The RTSMS 106 receives the media list, the media rules, the presentation identification, and any associated orders for the presentation for the ESRP 104.

The RTSMS 106 receives initial signaling from a viewer 116 or 118. This initial signaling may be routed to the RTSMS 106 via a reservation server 114 or another type of communication device. The initial signaling from the viewer 116 or 118 typically is a request for media.

The RTSMS 106 processes the signaling to determine if the requested media is available in a presentation and if the presentation has restrictions applied by the media owner and/or network operator and locates an NRP 108 within the streaming system 102 that is capable of processing the viewer's request. The RTSMS 106 then generates a customized play list for the requested presentation to the viewer. A play list is a list of named media references, such as a universal resource locator (URL), or other media items that are to be streamed to the viewer 116 or 118. The play list may include the requested media, such as one or more media clips, and additional media, such as one or more advertisements, either as media clips, banner advertisements, or other types of advertisements. The play list is formatted as the output of the presentation publication process and is formatted for the language/format of the viewer 116 or 118 media file. For example, a viewer 116 or 118 using the Real Network's Real Player would require a SMIL file based play lists, and the play list would be formatted as such.

The RTSMS 106 then builds a reservation for that viewer 116 or 118 for that customized play list and temporarily reserves the resources identified in the reservation process for use by the viewer 116 or 118. The RTSMS 106 transmits the reservation data to the selected NRP 108 and transmits the customized play list to the viewer 116 or 118.

The reservation data uniquely identifies the viewer 116 or 118 and the customized play list. In one embodiment, a separate URL identifies each name on a play list for a presentation, and the reservation has a unique reservation number that is located in each URL. The URLs are transmitted to the viewer 116 or 118 using the play list, and the viewer can use the play list to initiate a session with a switch. A reservation is a unique feature that enables the streaming system 102 to reserve system resources, such as switches, processors, or media, either now or in the future, to ensure a quality media experience.

The RTSMS 106 maintains historical, current, and future views of the processing tables that reside in all NRPs in the streaming system 102, including the NRP 108. These tables and the associated data stored by the RTSMS 106 enable the NRPs 108 to determine a switch, such as the MMS 110, that can provide the requested media to a viewer 116 and 118.

The RTSMS 106 collects state model data from all NRPs and switches in the streaming system 102, including the NRP 108 and the MMS 110. The state model data identifies a viewer using a reservation, identifies the switch from which it is streamed, identifies the media that is streamed, the duration the media is streamed, and other state changes in the streaming, such as whether a stream is paused, canceled, forwarded, or reversed. If a presentation is streamed, the state model data identifies the presentation and the media in the presentation. The state model data includes stream state changes, viewing session state changes, device mode changes from the NRP 108 and the MMS 110, error and alarm conditions for any MMS, NRP, SMS, ESRP, or other communication device in the streaming system 102. A state model is kept for each NRP and each MMS as described more fully below.

The RTSMS 106 also collects logs and billing data from the ESRP 104, the NRP 108, and the MMS 110. The billing data will include the order data and the reservation data and may include state model data described above. The logs are a record of the events that have occurred and are viewable and auditable. Logs are generated by many processes, such as one or more media servers on one or more stream casters, one or more NRPs, one or more MMSs, one or more reservation servers, and one or more ESRPs.

The RTSMS 106 processes the logs, the billing data, and the state model data and creates a detail record, such as a message sequence detail record (MSDR). The MSDR is a collated view of log and state model data. The RTSMS 106 creates an MSDR for every reservation by obtaining information from the reservation order log, the MMS 110 logs, and the NRP 108. This is accomplished using the unique reservation identification that is contained in every log and billing data file. The MSDR represents the billable event record that will be used for revenue settlement purposes.

The RTSMS 106 processes the MSDRs and creates bills in accordance with the media rules and orders identified in the presentations. Logs, state model data, and billing data for a single viewer 116 or 118 may come from more than one NRP, more than one MMS, and more than one ESRP.

The RTSMS 106 is able to collate all of this data into a single MSDR for a reservation identifying the viewer 116 or 118 using the reservation data and the state model data. This process of being able to service media requests from more than one switch or more than one stream caster on a switch is unique to this streaming system 102. Prior systems could not use multiple switches to provide media to a single viewer and clearly identify billing data because the prior systems cannot track and collate billing information from multiple switches. Prior systems service a media request from a single media server in these instances.

The RTSMS 106 can be configured to dynamically generate advertising. In one embodiment, the RTSMS 106 is configured to use statistical information to dynamically generate an advertisement for a presentation. For example, if it is known that a person using the viewer is between the ages of 18-25, the RTSMS 106 may dynamically place a media clip for a first advertisement in the presentation. Whereas if the person using the viewer is between the ages of 26-32, the RTSMS 106 may dynamically place a media clip for a second advertisement in the presentation. The ability to dynamically generate advertisement can result in a different revenue basis for different presentations. For example, in the above examples, revenue of three dollars may be collected for the first media clip, and revenue for four dollars may be collected for the second media clip. The RTSMS 106 can process the dynamic advertisement generation using statistical information and bill or credit entities according to order rules.

Statistical identification is the determination that the viewer is within a geographic area, such as a zip code or an NPA-NXX, that the viewer is within an age group, such as 18-23 years, that the viewer can watch movies of a designated media rating, such as PG, PG-13, or Y-14, that the viewer is male or female, the viewer's marital status, and other relevant personal data. If the presentation requires statistical identification of the viewer, the RTSMS 106 looks up any previously collected information about the viewer. If no information exists, the RTSMS 106 instructs the reservation server 114 to collect the required information. If the viewer does not supply the required information, the RTSMS 106 could reject the viewing request.

The RTSMS 106 provides reporting capabilities. The reports include near real-time reports of what media is streamed and the associated statistical information, including demographics on the entire network. The RTSMS 106 provides network management capabilities, including operational measurement collection, threshold alarming, and trend analysis.

The RTSMS 106 has a human machine interface (HMI) that enables a network operator to access the RTSMS or another communication device in the streaming system 106. The network operator can use the HMI to load new software to, for example, the MMS 110, to upgrade configurations, or to provide other maintenance, such as to execute functions specifying capacity to be used, to identify when switch components will be taken out of service for maintenance, to create new products or services for use by the a media owner, and to issue test presentations to specific media servers on an MMS.

The RTSMS 106 receives from the MMS 110 and any other switches information blocks, such as a streaming information blocks (SIBs), comprising signaling, event, and billing information associated with each streaming session. The RTSMS 106 combines the information in the SIB with fixed attributes, such as a viewer identification associated with a reservation number, a viewer profile, a viewer location, a media category being viewed, and other data to create a media signal detail record (MSDR). The RTSMS 106 uses the reservation number in the SIBs as the key to determining all SIBs for a presentation or a streaming event. The RTSMS 106 uses to reservation number to collate all SIBs for that presentation or streaming event into the MSDR. The MSDR therefore represents all data needed for billing records and reports for a presentation or other streaming event. The MSDR creates an auditable event record that is used for operational measurements and billing. The RTSMS 106 then can use the MSDR with rules identified in an order to determine bills and credits to be appropriated to various entities.

The RTSMS 106 receives from the NRP 108 and all other routing processors an NRP log comprising reservation routing requests and their granting or refusal, including identification of switches streaming media and the associated session data. The RTSMS 106 stores the NRP logs and retrieves the NRP logs if needed for auditing purposes.

An RTSMS 106 may be a local or regional RTSMS. The RTSMS 106 of FIG. 1 is depicted as a local RTSMS. One or more RTSMS devices may exist in the streaming system 102. One RTSMS 106 is depicted in FIG. 1 for clarity.

The NRP 108 receives a request from a viewer 116 and 118 and processes the request. The request contains the identification of NRP to which it is sent, and the reservation identification generated by the RTSMS 106. For example, the NRP 108 reservation may be an NRP host name or an NRP IP address, and the reservation identification may be a reservation number.

The NRP 108 processes the request and compiles a list of switches that may be able to provide the requested media to the requesting viewer 116 or 118. The NRP 108 identifies in order, and attempts to select, a switch based on network distribution rules. For example, the network supplier can choose to route on the best possible quality of service that can provided to the viewer 116 or 118, to route on geographic factors, the time of day, the day of the week, the day of the year, or the access provider, or to route on overall network conditions.

The NRP 108 communicates with the switches starting with the best-identified switches to determine which switch, if any, can provide the requested media. The NRP 108 transmits to the viewer 116 or 118 an IP address of the switch that can provide the requested media.

In one embodiment, a request is sent from the viewer 116 or 118 to the NRP 108 for each media clip on the play list. Thus, the NRP 108 must determine a switch that can stream the particular media clip of the play list to the viewer 116 or 118 separately for each media clip on the play list. Each time the NRP 108 determines the switch that can provide the media clip, the NRP transmits an IP address of the switch or a communication device, such as a stream caster on the switch, to the viewer 116 or 118.

For example, if a play list identifies two media clips, the viewer 116 or 118 transmits a media locator request to the NRP 108 for the first media clip. The NRP 108 determines a switch that can provide the first media clip and transmits an IP address of that switch to the viewer 116 or 118. After the viewer 116 or 118 receives the first media clip in a session with that switch, the viewer could send another media locator request to the NRP 108 for the second media clip. The NRP 108 determines a switch that can provide the second media clip and transmits an IP address of that switch to the viewer 116 or 118. The viewer then receives the second media clip in a session with that switch.

The switch that streams the first media clip may be the same as or different from the switch that streams the second media clip. Also, multiple devices on one switch, such as two different stream casters on a switch, each may stream one of the media clips or one device on the switch may stream both media clips.

The NRP 108 also can be configured to determine a switch that can provide all media clips on a play list. In this embodiment, a single determination is completed by the NRP 108 in which the NRP locates a single switch that can stream all media clips on the play list to the viewer 116 or 118.

The NRP 108 receives and processes signaling from each MMS and each other switch before, during, and after media is streamed. If a switch fails during a media streaming, the switch notifies the NRP 108, and the NRP determines a different, second switch that can provide the requested media. The NRP 108 then directs the failing switch to route the streaming session to the second switch.

The NRP 108 initiates a state model for each viewer and each streamed media. The state model comprises a view of an entire media streaming event to a viewer 116 or 118, including which switch or switches streamed media to the viewer, the time each media request is sent to each switch, any alarm or error events for a switch such as alarms or events that may require another switch to provide the requested media, and transfers or re-connections to another switch to provide the requested media. The state model includes an identification of devices within the switch that provide the requested media to the viewer 116 or 118, such as which stream caster or stream casters within an MMS 110 stream media to the viewer, as described more fully below.

The state model in the NRP 108 includes switch identification and the major states of a session or a connection, sometimes referred to as persistent states. Major states may include the reservation acceptance, an initiation of a session or connection, a termination of a session or connection, and other persistent states. The state changes may be receive when setup or teardown messages are received by the MMS 1100 and at other states. Each state change is identified with the reservation identification.

The NRP 108 transmits an NRP log to the RTSMS 106 when the media for a presentation has been streamed to a viewer 116 or 118, if an error occurs during a streaming session, and periodically during a streaming session. The period during the streaming session is configurable. In one embodiment, the period is every five minutes. Another period or default mechanism may be used, such as the occurrence of an event.

The NRP 108 may use the domain name system (DNS) protocol to receive the media locator request from the viewer 116 and 118 and to return an IP address of the stream caster in the MMS to which the viewer will connect for a session. Other protocols, such as SIP or H.323, may be used.

One or more NRP devices may exist in the streaming system 102. One NRP is depicted in FIG. 1 for clarity.

The MMS 110 streams media to a viewer 116 or 118. The MMS 110 has other communication devices, such as one or more stream casters and one or more media servers, that provide requested media to a viewer 116 or 118. The MMS 110 monitors all communication devices, such as one or more stream casters and one or more media servers, within the MMS so that at any time the MMS can determine if it can provide a requested media.

The MMS 110 may have a stream routing processor (SRP) or another type of processor or monitor that processes requests for media using the current state of the switch, such as available bandwidth, bandwidth necessary to provide a requested media, hardware and software version compatibility, disk space capacity, and the current operating mode of the MMS. The MMS 110 monitors the delivery of each media stream and the status of switch systems. The MMS 110 detects imminent failure of communication devices in the MMS, such as failure of a stream caster's media server. The MMS 110 can transmit this data to the NRP 108.

If a stream caster, a media server on the stream caster, or another communication device in the MMS 110 fails, the MMS can transparently transfer all streams in-progress to another stream caster or to another media server on the stream caster, if one is available. The transfer and the continued streaming of the media are not recognizable by the viewer 116 and 118.

If a communication device on the MMS 110 fails and another is not available on that MMS, the MMS notifies the NRP 108 and the RTSMS 106. In response, the MMS 110 will receive and process from the NRP 108 a message instructing the MMS to route the stream to another MMS. The MMS 110 then will route the stream to the identified MMS.

The MMS 110 has a state model in which the MMS stores information and state changes for a viewing session of a presentation. The MMS 110 stores and reports each state change at the appropriate level. For example, the state model stores information and state changes for the initiation of a session, the termination of a session, and all viewing events. Viewing events are events triggered by a viewer that affect the media streaming of the presentation. Viewing events may be, for example, a pause, a stop, a forward, a cancel, or a rewind.

If the MMS 110 transfers a stream to a different stream caster or a different media server, that event is noted in the state model, and the state model stores the information and state changes for the new stream caster or media server. If the MMS 110 transfers a stream to a different MMS, that event is noted in the state model.

The MMS 110 processes signaling from the NRP 108 and returns signaling to the NRP 108. The MMS 110 receives signaling messages inquiring if the MMS can stream media to a viewer 116 or 118. The MMS 110 processes that inquiry, determines if it has the resources, such as a stream caster type, network bandwidth, disk space, and a media server, to stream the media, and responds with a message to the NRP 108 accepting or denying the inquiry.

The MMS 110 receives reservation data from the NRP 108 for a media clip in a presentation. If the MMS 110 receives the reservation number for the presentation from the viewer 116 or 118 within a configurable period of time, the MMS 110 will stream the media to the viewer. If the viewer 116 or 118 does not transmit the valid reservation number to the MMS 110 for that presentation, or if the viewer transmits the correct reservation number but not within the configurable period of time, the MMS will not stream the media to the viewer. In that instance, the MMS 110 will reject the request from the viewer 116 or 118, and a session will not be initiated, but the rejection is transmitted to the RTSMS 106.

The MMS 110 transmits to the RTSMS 106 stream information blocks (SIBs) for each stream session event and for each viewing session event. The SIB comprises information associated with the streaming session from the MMS 110 to the viewer 116 or 118, including the reservation number, an identification of the MMS or other switch, the stream caster and media server used, the media streamed, the presentation identification, the packet data path for each session, the equipment used for the streaming, and/or viewing events, such as a pause or rewind. One or more of the previous items may be used or not used in the SIB. If more than one stream caster or media server on one or more stream casters is used, that information also is specified.

An SIB is transmitted when a viewing session is initiated, when a viewing session is terminated, when new media is presented, during a streaming session at configurable periods, and when a viewing event occurs, such as a pause, stop, rewind, forward, or error. In one embodiment, the period is configured at five minutes. Other periods, different periods, or defaults, such as an, event, can be used.

One or more MMS devices may exist in the streaming system 102. One MMS is depicted in FIG. 1 for clarity.

The packet networks 112 and 120 are any packet network capable of transmitting data, such as signaling or media streaming, to or from a communication device in the streaming system 102, such as to or from the ESRP 104, the RTSMS 106, the NRP 108, the MMS 110, the reservation server 114, and/or the viewers 116 and 118. The packet networks 112 and 120 may be the Internet, an intranet, a virtual private network, a cable system, a frame relay network, an ATM network, a satellite network, and/or other packet based networking solutions. In one embodiment, the packet network 112 is a private network accessible by the ESRP 104, the RTSMS 106, the NRP 108, the MMS 110, and an authorized reservation server 114. In one embodiment, the packet network 120 is a public network.

The reservation server 114 is any server capable of communicating with a viewer 116 or 118. The reservation server 114 manages communications between the viewer 116 and 118 and the RTSMS 106. For example, the reservation server 114 may transmit viewer media selections to the RTSMS 106 and may transmit reservation data originating from the RTSMS to the viewer 116 or 118. The reservation server 114 may be a web-based server, a set top server, or another type of server. The viewer 116 or 118 may use the hypertext mark-up language (HTML) IP protocol via IP sessions using a web browser that can be serviced by a web-based server. The viewer 116 or 118 also may use broadband protocols via a broadband connection using a set top box appliance communicating with a set top server. A set top server can process various protocols, including session initiation protocol (SIP), which is an International Telecommunications Union (ITU) H.323 series protocol. The reservation server 114 of FIG. 1 is authorized to transmit messages to the RTSMS 106.

The viewers 116 and 118 are any communication device capable of transmitting and/or receiving signaling or media. The viewers 116 and 118 may be broadband based viewers or in-band based viewers. For example, the viewers 116 and 118 may have a browser configured to communicate using a web based protocol such as hypertext transfer protocol (HTTP). Also, the viewers 116 and 118 may have a media player configured to play media that is streamed to the viewers. In addition, the viewers 116 and 118 may have a set top box or another digital appliance configured to play media streamed from a cable television provider, a digital satellite provider, or another type of provider.

In some embodiments, the NRP 108 requests the MMS 110 to provide a media clip. In this embodiment, if the MMS 110 can provide the requested media clip, the MMS responds to the NRP 108 that it can provide the requested media clip. The NRP 108 transmits a message to the viewer identifying the MMS 110 as providing the media clip. The viewer 116 initiates a session or a connection to the MMS 110, and the MMS provides the requested media clip.

In other embodiments, the NRP 108 requests the MMS 110 to provide multiple media clips. In this embodiment, if the MMS 110 can provide the requested media clips, the MMS responds to the NRP 108 that it can provide the requested media clips. The NRP 108 transmits a message to the viewer identifying the MMS 110 as providing the media clips. The viewer 116 initiates a session or a connection to the MMS 110, and the MMS provides all of the requested media clips without further action from the NRP 108. In this embodiment, in one instance, the viewer 116 or 118 initiates a single session or connection with a single setup message, and the MMS 110 streams all requested media clips before the session or connection is terminated. In another instance, the viewer 116 or 118 transmits a separate setup message and teardown message for each media clip, and the MMS 110 stops streaming media after the last requested media clip is streamed.

In other embodiments, the NRP 108 requests the MMS 110 to provide multiple media clips. In this embodiment, if the MMS 110 can provide the requested media clips, the MMS responds to the NRP 108 that it can provide the requested media clips. The NRP 108 transmits a message to the viewer identifying the MMS 110 as providing the media clips. The viewer 116 initiates a session or a connection to the MMS 110, and the MMS provides all of the requested media clips. However, after each media clip is streamed, the viewer 116 or 118 communicates with the NRP 108 to receive authorization to initiate a session with the MMS 110. The NRP 108 communicates with the MMS 110 to confirm that the MMS 110 can provide the next media clip. The MMS 110 acknowledges to the NRP 108 that it can provide the next media clip, and the NRP acknowledges to the viewer 116 that the MMS 110 can provide the next media clip. The viewer 116 then transmits another setup message to the MMS 110 to obtain the next media clip.

In some embodiments, the NRP 108 requests the MMS 110 to provide a presentation. In this embodiment, if the MMS 110 can provide the requested presentation, the MMS responds to the NRP 108 that it can provide the requested presentation. The NRP 108 transmits a message to the viewer identifying the MMS 110 as providing the presentation. The viewer 116 initiates a session or a connection to the MMS 110, and the MMS provides the requested presentation. In some instances in this embodiment, the viewer 116 transmits a setup message for each media identified in the presentation play list, receives the media, and tears down the session or connection for that media. The viewer 116 then immediately transmits another setup message to the MMS 110 to get the next media on the play list. The viewer 116 receives the media and tears down the session or connection. This process continues until the viewer 116 has received all media on the play list. In other instances in this embodiment, the viewer 116 transmits a setup message to the MMS 110, receives the media, transmits a teardown message to the MMS, and communicates with the NRP 108 prior to transmitting another setup message to the MMS to confirm that the MMS will provide the next media clip on the play list.

The examples for all Figures below reference publication by an owner, a distribution by the ESRP 104, a request and selection by a viewer 116 or 118 of media, the reservation made by the RTSMS 106, the communication to between the RTSMS and the NRP 108, the subsequent request from the NRP to the MMS 110, the acknowledgement or denial or service by the MMS, the communication from the NRP to the viewer denying or accepting the presentation streaming, and the subsequent session or connection from the viewer to the MMS. In the examples, reference to these actions identifies the embodiment as distributing, requesting, or providing the media in accordance with either the presentation embodiment or the media clip embodiment described above. However, this discussion uses the presentation embodiment and the media clip embodiment for clarity and conciseness. It should be appreciated that any of the above stated embodiments, or any combinations thereof, may be used.

The streaming system 102 of FIG. 1 operates as follows. In a first example, a media owner generates a presentation with an order that is placed on the ESRP 104. The presentation has multiple media items, including a media clip for a movie and an advertisement. The presentation includes a time restriction that it is not to be played between the hours of 7:00 p.m. and 9:00 p.m. Pacific Time. The presentation further includes a geographic restriction requiring the presentation to be placed on a switch in the western region of the United States, including California.

The order for the presentation includes billing information, such as a credit that is to be provided to the media owner of 80% of the revenue generated from the presentation, and the advertising owner is to be credited for the remaining 20%. The media owner publishes the presentation with the respective order to the ESRP 104.

The ESRP 104 processes the presentation with its respective media rules and order. The ESRP 104 distributes the presentation to multiple switches in the western United States, including California. The ESRP 104 also transmits to the RTSMS 106 the publication data, including an identification of the media clips in the presentation, the media rules, and the order.

A viewer 116 selects an option to obtain one or more presentations which for example, contain movie media clips. In this example, the option is a link on the reservation server 114. When the link is selected, the reservation server 114 calls the RTSMS 106.

The RTSMS 106 is notified that the viewer 116 requested access to the presentation. The RTSMS 106 determines that the presentation is active within the network and the order may request addition viewer billing information, such as a credit card for a pay per view event or a subscription password to be supplied for billing authorization. The RTSMS 106 determines if the presentation contains media rules that require a statistical identification of the viewer. If required by the media rules, the, the RTSMS 106 collects the statistical information.

The RTSMS 106 builds a reservation having the identification of the viewer, the identification of the NRP 108. In this example, the NRP identification is the host name of the NRP 108. The reservation also includes the presentation identification, including the customized play list of the presentation. The customized play list includes media selected based upon the statistical identification data, time of day, day of week, and personal viewing preferences. The RTSMS 106 transmits the reservation data to the NRP 108. In addition, the RTSMS 106 transmits to the viewer 116 the play list with each entry on the play list having the host name of the NRP, the reservation number, and the presentation identification.

The viewer 116 transmits a media locator request to the NRP 108. The media locator request comprises the at least one name on the play list, the NRP host name, and the reservation number. The NRP 108 uses the received reservation number to obtain the presentation identification plus additional data about the reservation. The NRP 108 processes the media locator request and the reservation data to determine if an MMS within the streaming system 102 can service the request. The NRP 108 compiles a list of MMSs that have the presentation and that can provide the presentation according to the media rules. In this example, the NRP 108 determines, based on load balancing factors and network distribution rules, that the MMS 110 is the best selection to provide the presentation.

The NRP 108 communicates with the MMS 110 to determine if the MMS can provide the presentation. The MMS 110 responds that it can provide the presentation to the viewer 116. In this example, the MMS 110 has a stream caster that can stream the presentation to the viewer 116.

The NRP 108 transmits to the viewer 116 an IP address of the MMS 110. In addition, the NRP 108 transmits the reservation data to the MMS 110. Also, the NRP 108 saves information in a state model identifying the reservation number, the presentation identification, that the MMS 110 will stream the presentation to the viewer 116, and the time of the MMS acceptance of the streaming request.

The viewer 116 receives an IP address and initiates a session with the MMS 110. The MMS 110 streams the presentation to the viewer 116, including the movie media clip and the advertisement. The MMS 110 retains information in a state model identifying the reservation number, the presentation identification, the start and stop times of each media on the play list, and any viewing events, such as a pause, a forward, a reverse, or other events.

When each media on the play list has been streamed to the viewer 116, the viewer initiates an end to the session. The MMS 110 stores information in the state model identifying the end of the session. The MMS 110 transmits its logs, SIB information, and state model information to the RTSMS 106.

The MMS 110 notifies the NRP 108 that the presentation streaming is complete. The NRP 108 stores information in the state model 108 identifying that the presentation streaming is complete and transmits the state model data to the RTSMS 106.

The RTSMS 106 processes the logs, the SIB information, and any additional data that originated from state models from both the NRP 108 and the MMS 110. The RTSMS 106 collates the data using the reservation number to produce the MSDR data identifying billable events, including the presentation that was streamed to the viewer 116 and the amount of media and time streamed to the viewer. The RTSMS 106 applies the order rules to the MSDRs and produces as an example a financial settlement. In this example, the RTSMS 106 produces a report identifying a credit of 80% of the revenue generated by the presentation for the media owner and a credit of 20% of the revenue generated by the presentation to the advertisement owner.

In another example, the viewer 118 requests media and receives a reservation from the RTSMS 106 to view a presentation. The presentation has three media clips. In addition, the NRP 108 has received the reservation data from the RTSMS 106. In this example, the MMS 110 has two stream casters.

The viewer 118 transmits a request containing the reservation to the NRP 108. The NRP 108 processes the media locator request with the reservation data received from the RTSMS 106 to compile a list of switches that can provide the requested presentation. The NRP 108 communicates with the MMS 110 to determine if the MMS can provide the presentation to the viewer 118. The MMS 110 responds to the NRP 108 that it has a stream caster that can stream the presentation to the viewer 118. The NRP 108 transmits an IP address of the first stream caster on the MMS 110 to the viewer 118.

The viewer 118 initiates a session with the first stream caster on the MMS at an IP address provided by the NRP 108. The MMS 110 stores all information regarding the streaming and the state model. In addition, the MMS 110 notifies the NRP 108 that the streaming session has been initiated.

The NRP 108 stores information in a state model identifying the MMS 110 as providing the presentation. This information is transmitted in an NRP log to the RTSMS 106 at a specified configurable time. In this example, the NRP 108 transmits the NRP log to the RTSMS 106 every five minutes. In other examples, the NRP 108 can be configured to transmit the NRP log to the RTSMS when a session is initiated between a viewer and a particular switch and when that session is terminated. In addition, in other examples the NRP 108 can be configured to transmit the NRP log at other configurable times or different configurable times.

When the session is initiated between the viewer 118 and the MMS 110, the MMS transmits an SIB to the RTSMS 106. In addition, while the media is streamed from the MMS 110 to the viewer 118, an SIB is transmitted to the RTSMS 106 at a configurable time. In this example, the configurable time is every five minutes. In other examples, the time may be configured at other periods of duration or different periods of duration. In addition, in this example, the MMS 110 transmits an SIB to the RTSMS 106 when viewing events occur, such as a stop, a pause, a forward, or a rewind. Also, when the presentation streaming is complete and the session is terminated, the MMS 110 transmits an SIB to the RTSMS 106.

When the session is complete and terminated, the MMS 110 notifies the NRP 108. The NRP 108 transmits a final NRP log to the RTSMS 106.

In this example, the RTSMS 106 collates all of the SIBs into an MSDR. The MSDR then can be used to provide billing records to billing entities according to billing rules, such as those that may be in an order associated with the presentation. In other examples, the RTSMS 106 may use the NRP logs in conjunction with the SIBs to create the MSDR.

In another example, the viewer 116 has received a reservation from the RTSMS 106. In addition, the NRP 108 has received the reservation data from the RTSMS 106. The viewer 116 transmits a media locator request to the NRP 108, and the NRP 108 processes the media locator request with the reservation data received from the RTSMS 106. The NRP 108 compiles a list of switches, including the MMS 110, that can provide the presentation identified in the reservation. The NRP 108 communicates in turn with the MMS 110 to determine if the MMS can provide the presentation. The MMS replies to the NRP 108 specifying that it can provide the presentation. The NRP 108 transmits an IP address of the MMS 110 to the viewer 116.

The viewer 116 initiates a session with the MMS 110. The MMS 110 streams the presentation to the viewer 116 as requested.

While the MMS 110 is streaming the presentation to the viewer 116, an error occurs, and the MMS is not able to continue streaming the presentation to the viewer. The MMS 110 notifies the NRP 108 that it cannot continue streaming the presentation to the viewer 116.

Figure 2:
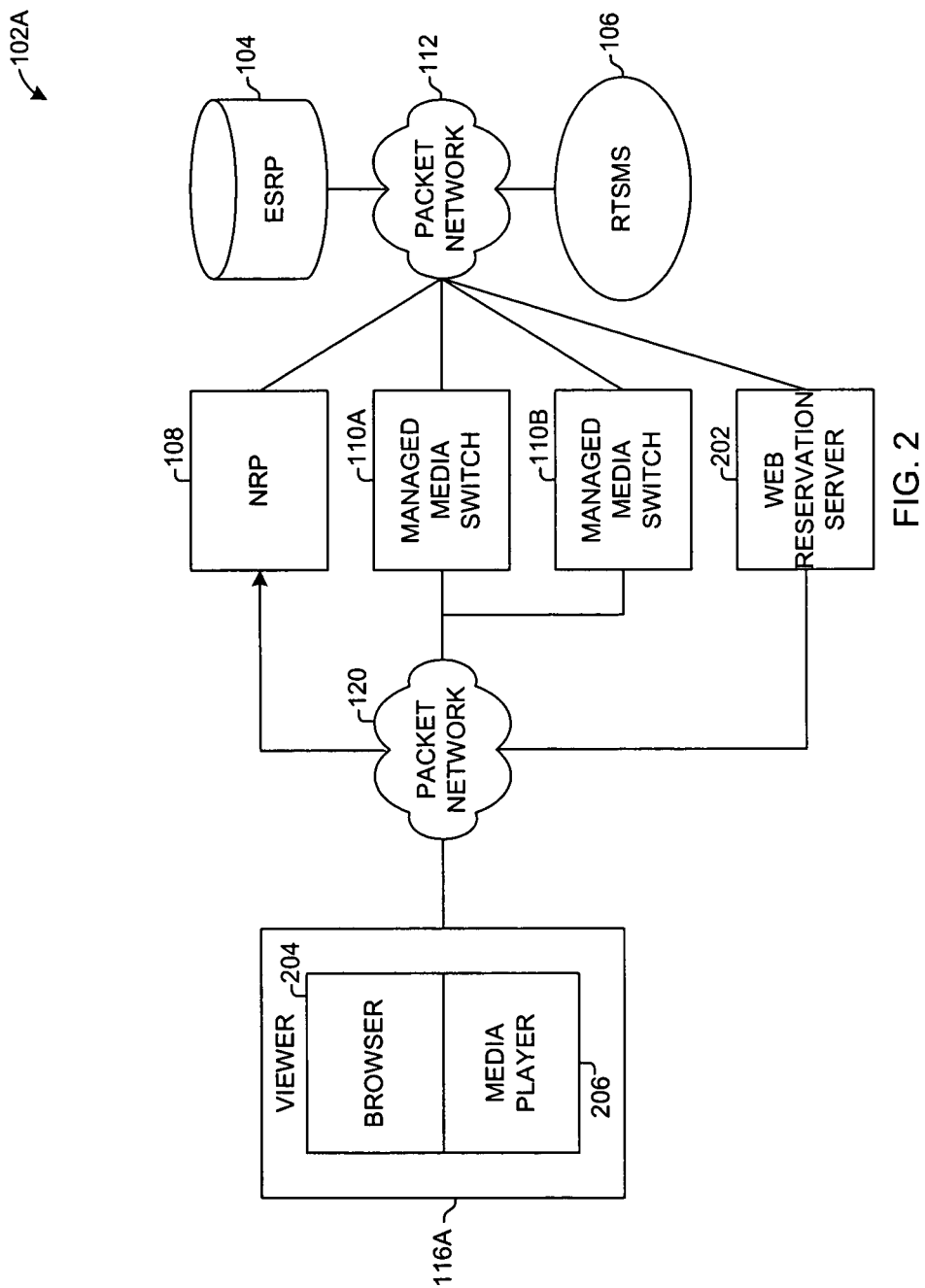
FIG. 2 is a block diagram of a streaming system using in-band signaling in accordance with an embodiment of the present invention.
Figure 3:
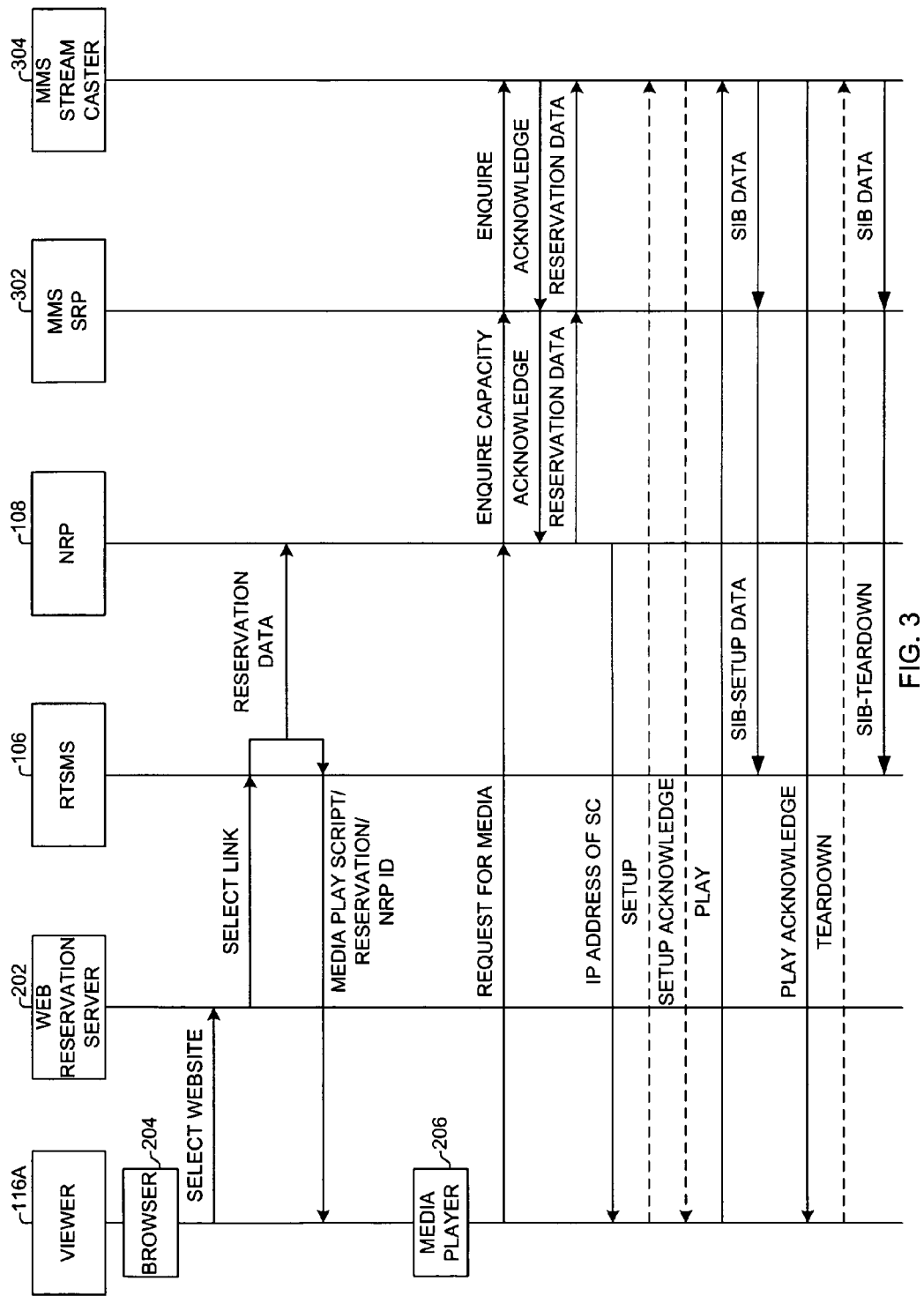
FIG. 3 is a sequence chart depicting in-band signaling in a streaming system in accordance with an embodiment of the present invention.

The NRP 108 determines that the session for the presentation must be re-routed and communicates with a second MMS identified on the list of switches capable of providing the presentation (see FIG. 2 or FIG. 3). The second MMS notifies the NRP 108 that it can provide the presentation. The NRP 108 notifies the MMS 110 to route the session to the second MMS.

The session is routed to the second MMS. The second MMS provides the rest of the presentation to the viewer 116. When the presentation is provided, the session is terminated by the viewer 116. The second MMS notifies the NRP 108 that the streaming for the presentation is complete and the session is terminated.

In this example, the MMS 110 transmitted SIBs to the RTSMS 106 when the session was initiated, during the configurable periods of time while the presentation was streaming, during any viewing events, and when the stream caster failed and the session was routed to the second MMS. Likewise, the second MMS transmitted SIBs to the RTSMS 106 when the session was routed to the second MMS and the second MMS started streaming the media for the presentation, during the configurable period of time while the presentation was streaming, when any viewing events occurred, and when the session was terminated. Each of the SIBs identify the reservation number for the presentation. In addition, the NRP 108 transmits NRP logs to the RTSMS 106 identifying both the MMS 110 and the second MMS when the respective MMSs provided the media streaming for the presentation.

The RTSMS 106 receives the SIBs from the MMS 110 and the second MMS. The RTSMS 106 collates the SIBs to create an MSDR using the reservation number identified in each SIB. The MSDR then can be used for settlement purposes.

In another example, the viewer 118 requests access to media. The RTSMS 106 returns a reservation to the viewer 118. The reservation includes a play list that has two media clips in addition to the reservation identification and the NRP identification. In this example, the media clips are identified by a URL, and the reservation identification is a reservation number attached to the URL. Also, the NRP identification is this example is a host name for the NRP 108. The RTSMS 106 also transmits the reservation data to the NRP 108.

The viewer 118 transmits a request to the NRP 108. In this example, the request is a media locator request. The media locator request identifies the play list reservation identification. The NRP 108 processes the media locator request and the reservation data received from the RTSMS 106. The NRP 108 compiles a list of all possible switches that can handle the presentation identified by the play list.

The NRP 108 communicates with the MMS 110 to determine if the MMS can provide the presentation. The MMS 110 transmits a message back to the NRP 108 identifying that it can provide the presentation. The NRP 108 transmits an IP address of the MMS 110 to the viewer 118.

The viewer 118 initiates a session with the MMS 110. The MMS 110 streams the media for the first media clip identified on the play list to the viewer 118.

In this example, when the viewer 118 has received all of the media for the first media clip, the viewer terminates the streaming session by initiating a tear down message. This may occur, for example, when the next media clip on the play list requires a different media server type.

The viewer 118 determines that there is a second media clip of a different media server type on the play list for the presentation. The viewer 118 contacts the NRP 108 to determine if a switch is able to provide the second media clip for the presentation.

The NRP 108 communicates with the MMS 110 to determine if the MMS can provide the second media clip on the play list for the presentation. The MMS 110 communicates back to the NRP 108 with a message stating that the MMS 110 cannot provide the second media clip on the play list for the presentation because the MMS does not have the required media server.

The NRP 108 receives the message from the MMS 110. The NRP 108 communicates with a second MMS (see FIGS. 2 and 3) to determine if the second MMS can provide the second media clip on the play list for the presentation. The second MMS communicates a message to the NRP 108 that it can provide the second media clip on the play list for the presentation. The NRP 108 transmits a message to the viewer 118 identifying an IP address of the second MMS.

The viewer 118 initiates a session with the second MMS at the identified IP address. The second MMS streams the second media clip in the play list for the presentation to the viewer 118. When the streaming for the second media clip is complete, the viewer 118 terminates the session. The second MMS notifies the NRP 108 that the streaming for the second media clip is complete, and that the session is terminated.

The MMS 110 and the second MMS transmit SIBs to the RTSMS 106 at the initiation of each session, at the termination of each session, upon viewing events, and at configurable periods of time. In addition, the NRP 108 transmits NRP logs to RTSMS 106. The SIBs and the NRP logs identify the reservation number for the presentation.

The RTSMS 106 collates the SIBs from each of the MMS 110 and the second MMS to create an MSDR. The MSDR can be used for billing records and other settlement purposes.

FIG. 2 depicts an exemplary embodiment of a streaming system of the present invention configured to transmit media and signaling in band. The streaming system 102A of FIG. 2 comprises an ESRP 104, an RTSMS 106, and an NRP 108, all of which are the same as those described in FIG. 1. The streaming system 102A also comprises a first MMS 110A and a second MMS 110B, both of which are the same as the MMS 110 of FIG. 1. In addition, the communication devices communicate through the packet networks 112 and 120, both of which are the same as the packet networks described in FIG. 1. The streaming system 102A also comprises a web reservation server 202 and a viewer 116A comprising a browser 204 and a media player 206.

The web reservation server 202 is a reservation server similar to the reservation server 114 of FIG. 1. However, the web reservation server 202 is configured to handle web-based communications, such as communications using the HTTP protocol.

The browser 204 is any web-based browser. The browser 204 is any tool used to navigate and access IP-based information. The browser 204 provides the ability to access, transfer, and receive data across the packet network 120. The browser 204 may use the HTTP protocol or another protocol to communicate via the packet network 120. Examples of browsers include the Microsoft Internet Explorer brand browser and the Netscape Navigator brand browser.

The media player 206 is the system on the viewer 116A configured to play the streaming media that is transmitted from the MMS 110A or 110B. The media player 206 also can transmit signaling to request media, to request a setup for a session or connection, to tear down a session or connection, to identify lost frames, to identify errors, and to identify viewing events, such as a pause, a stop, a forward, or a rewind. Examples of a media player include Real Network Real Player, Microsoft Media, Apple Quick Time, and other media players. The media player 206 is configured to play any streamed media of any protocol.

The streaming system 102A with the viewer 116A and the web reservation server 202 operates in accordance with the following examples. Since the ESRP 104 operates as described in FIG. 1, its operation will not be restated. In addition, since the RTSMS 106 operates according to the description and the examples of FIG. 1, all of its functionality will not be restated.

In addition, the sequence charts of FIG. 3 will be referenced to describe the operation of the system FIG. 2. The SRP 302 can be the SRP of either the MMS 110A or the MMS 110B. In addition, the stream caster 304 can be one of many stream casters on either the MMS 110 or the MMS 110B.

With reference to FIGS. 2 and 3, in a first example the browser 204 selects and browses a web site on the web reservation server 202. The browser 204 selects a link, operates on a URL identified in the locator bar, or otherwise selects an option on the web reservation server 202 to obtain media. In this example, the media request is a request for a presentation.

A request for the presentation is made from the web reservation server 202 to the RTSMS 106 through the packet network 112. The RTSMS 106 processes the request, determines that all of the media for the presentation is available, and builds a reservation for the presentation for that viewer 116A.

The RTSMS 106 transmits the reservation data to the NRP 108. In addition, the RTSMS transmits a customized play list to the browser 204, which includes the list of media names each media name having an appended reservation number, and the identification of the NRP 108. In this example, each media name also comprises the host name of the NRP 108.

The media player 206 transmits a message to the NRP 108 requesting the media name, which includes the reservation number. The NRP 108 processes the reservation data from the RTSMS 106 and the message from the media player 206 to determine a list of switches that can provide the requested media. The NRP 108 determines that the MMS 110A and the MMS 110B can provide the requested media.

The NRP 108 communicates with the SRP 302 of the MMS 110A to determine if the MMS has the capacity to provide the requested media. The SRP 302 communicates with the stream caster 304 to determine if the stream caster is healthy and if the stream caster has the capacity to provide the requested media. The stream caster 304 responds to the SRP 302 that it can provide the media, and the SRP responds to the NRP 108 that it has a stream caster 304 that can provide the requested media. The SRP 302 also provides to the NRP 108 an IP address for the stream caster 304.

The NRP 108 transmits the reservation data to the SRP 302, and the SRP transmits the reservation data to the stream caster 304. The NRP 108 also transmits an IP address of the stream caster 304 to the media player 206.

The media player 206 transmits a setup message to the stream caster 304. The setup message includes the reservation identification, the media identification, and a presentation identification for the play list. The stream caster 304 acknowledges to the media player 206, thereby confirming that the reservation was accepted and that the media will be streamed to the media player.

The media player 206 requests the stream caster 304 to play the media. The stream caster 304 transmits the SIB data for the streaming session to the SRP 302. The SRP formats the SIB data into a SIB for the setup and transmits the SIB for the setup to the RTSMS 106. Meanwhile, the stream caster 304 transmits a play acknowledgment to the media player 206 and streams the media to the media player.

When the media has been streamed, the media player 206 transmits a teardown message to the stream caster 304. The stream caster 304 transmits the SIB data for the teardown to the SRP 302. The SRP 302 builds the SIB for the teardown and transmits the SIB to the RTSMS 106. In this example, a teardown acknowledgment is not transmitted from the stream caster 304 to the media player 206. It should be noted that viewing events may occur between the time a play acknowledgment is transmitted from the stream caster 304 to the media player 206, thereby starting the streaming of the media, and the time the teardown message is transmitted from the media player to the stream caster.

In this example, the setup message, the setup acknowledgement message, and the teardown message are transmitted between the media player 206 and the stream caster 304 in-band. These messages are depicted as dashed lines in FIG. 3 for clarity.

In another example, two media clips are identified in a play list. For each media clip identified in the play list, the media player 206 goes through the process identified between the request for media message and the teardown message. Thus, the media player 206 requests the media, connects to an IP address of the selected stream caster, sets up a session, requests that the media be played, and tears down the session when the media streaming is complete. For the second media clip in the play list, the media player 206 again requests the media, sets a session to an IP address of a selected stream caster, requests that the media be played, and tears down the session when the media streaming is complete.

In another example, the media player 206 sends an additional setup message to the same IP address on the stream caster 304, requests that the media be played, and tears down the session when the media streaming is complete. In this example, the media player 206 does not communicate with the NRP 108 after the first media clip is streamed to request an identification of an IP address of an MMS from which the second media clip will be streamed.

Figure 4:
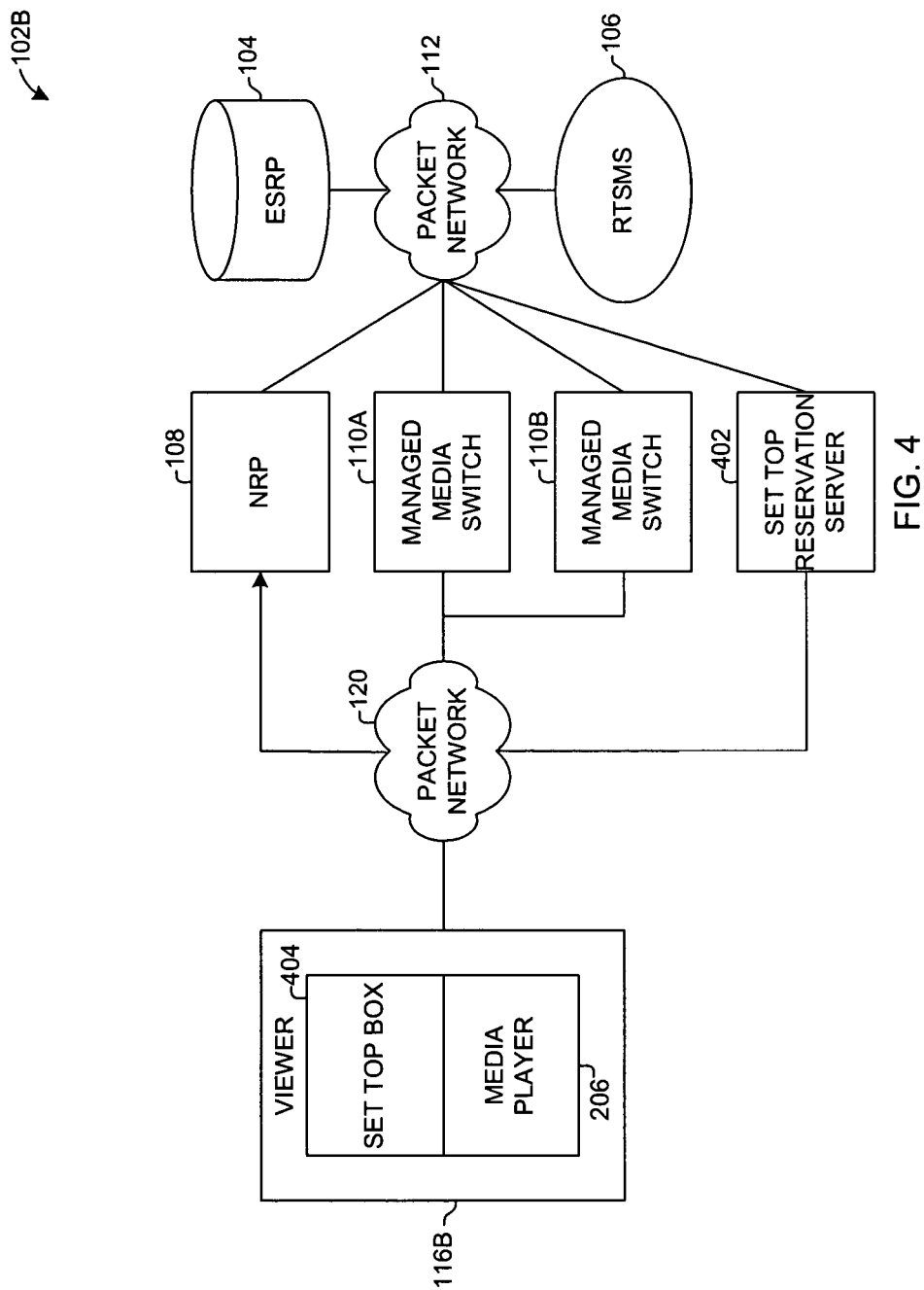
FIG. 4 is a block diagram of a streaming system using out-of-band signaling in accordance with an embodiment of the present invention.

FIG. 4 depicts an exemplary embodiment of a streaming system of the present invention using broadband access. The streaming system 102B comprises the ESRP 104, the RTSMS 106, the NRP 108, the packet network 112, and the packet network 120 of FIG. 1. In addition, the streaming system 102B uses the same MMS 110A, MMS 102B, and the media player 206 of FIG. 2 although, the media player 206 is configured to operate in a broadband environment. In addition, the streaming system 102B comprises a set top reservation server 402 and a viewer 116B having a set top box 404.

The set top reservation server 402 is a reservation server similar to the reservation server 114 of FIG. 1. However, the set top reservation server 402 is configured in this example to receive and transmit communications and signaling via a broadband protocol, such as the SIP protocol.

The set top box 404 is configured to receive and transmit broadband communications and signaling. An example of a set top box includes a cable television electronics box configured to receive an incoming coaxial cable. Other examples of set top boxes include satellite receivers. Other set top boxes or digital appliances may be used.

In the embodiment of FIG. 4, the viewer 116B has a broadband connection to receive and transmit signaling and a broadband connection to receive the media. The media connection also may be configured to carry in-band signaling in some embodiments. The connections each may be a virtual circuit, such as a virtual path/virtual connection, or another type of connection.

In this embodiment, the MMS 110A or the MMS 110B providing the media to the viewer 116B can monitor the broadband connection or connections to the viewer's set top box 404. If the MMS 110A or 110B providing the media determines that a quality of service problem exists with the connection, the MMS can request the switch (not shown) providing the broadband connection to provide a better quality of service connection.

The streaming system 102B with the viewer 116B and the set top reservation server 402 operates in accordance with the following examples. Since the ESRP 104 operates as described in FIG. 1, its operation will not be restated. In addition, since the RTSMS 106 operates according to the description and the examples of FIG. 1, all of its functionality will not be restated.

Figure 5:
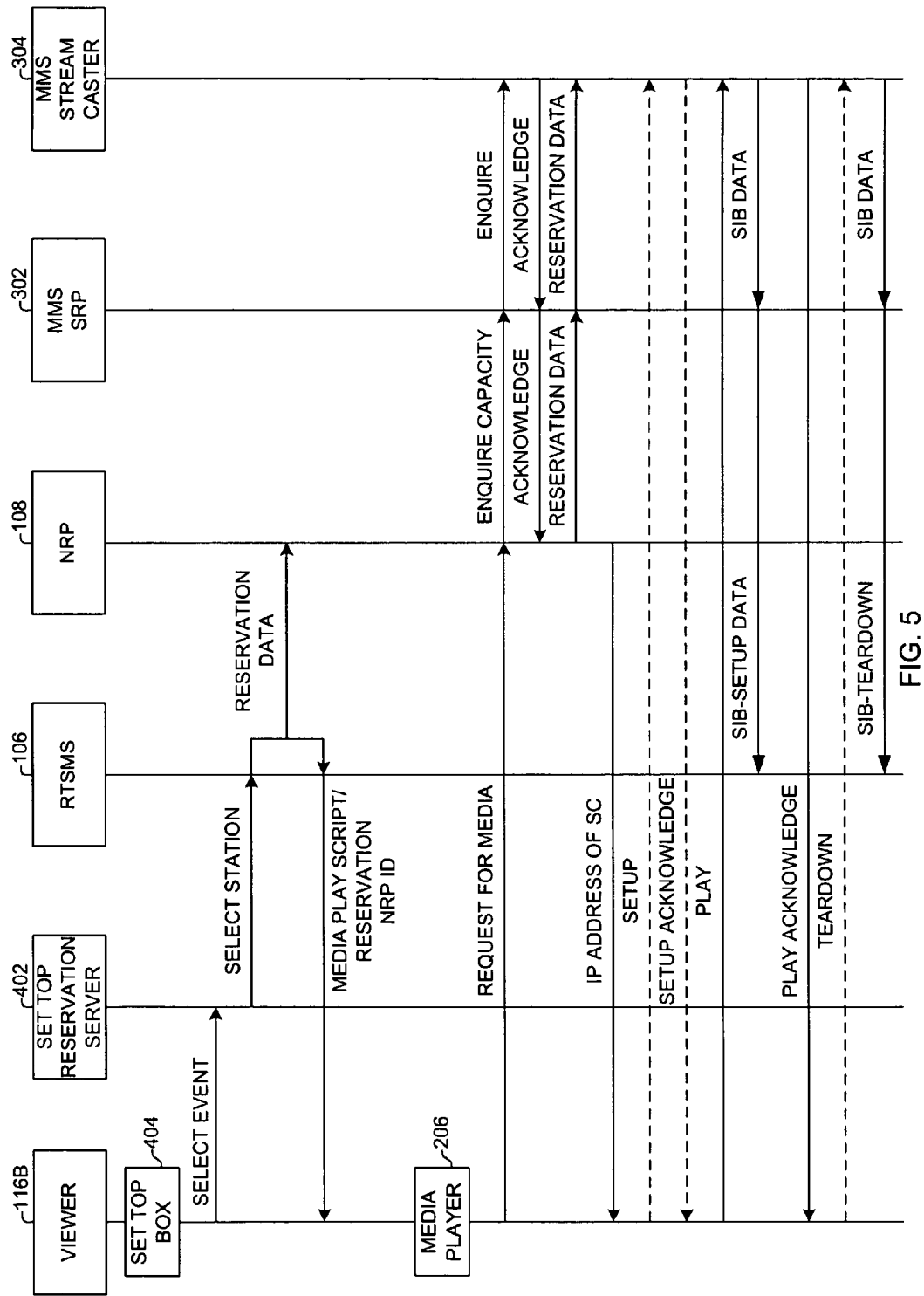
FIG. 5 is a sequence chart depicting out-of-band signaling in a streaming system in accordance with an embodiment of the present invention.

In addition, the sequence charts of FIG. 5 will be referenced to describe the operation of the system of FIG. 4. The SRP 302 can be the SRP of either the MMS 110A or the MMS 110B. In addition, the stream caster 304 can be one of many stream casters on either the MMS 110 or the MMS 110B.

With reference to FIGS. 4 and 5, in a first example the set top box 404 selects an event, such as a movie or a live event, to be streamed, and transmits that selection to the set top reservation server 402. The set top reservation server 402 selects a provider, such as a cable station, that is listed as providing the event. A request for the event is made from the set top reservation server 402 to the RTSMS 106 through the packet network 112.

The RTSMS 106 processes the request, determines that the media for the event is available, and builds a reservation for the media for that viewer 116A. The RTSMS transmits the reservation data to the NRP 108. In addition, the RTSMS transmits the reservation to the set top box 404, including the reservation number, the media play list, and the identification of the NRP 108. In this example, the NRP identification is an IP address of the NRP 108.

The media player 206 transmits a message to the identified IP address of the NRP 108 requesting the media and including the reservation number. The NRP 108 processes the reservation data from the RTSMS 106 and the request from the media player 206 to determine a list of switches that can provide the requested media. The NRP 108 determines that the MMS 110A and the MMS 110B can provide the requested media.

The NRP 108 communicates with the SRP 302 of the MMS 110A to determine if the MMS has the capacity to provide the requested media. The SRP 302 communicates with the stream caster 304 to determine if the stream caster is healthy and if the stream caster has the capacity to provide the requested media. The stream caster 304 responds to the SRP 302 that it can provide the media, and the SRP responds to the NRP 108 that it has a stream caster 304 that can provide the requested media.

The NRP 108 transmits the reservation data to the SRP 302, and the SRP transmits the reservation data to the stream caster 304. The NRP 108 also transmits an IP address of the stream caster to the media player 206.

The media player 206 transmits a setup message to the stream caster 304. The setup message includes the reservation identification and the media identification, and a presentation identification for the play list. The stream caster 304 acknowledges to the media player 206, thereby confirming that the reservation was accepted and that the media will be streamed to the media player.

The media player 206 requests the stream caster 304 to play the media. The stream caster 304 transmits the SIB data for the session to the SRP 302, and the SRP formats the SIB data into a SIB for the setup and transmits the SIB for the setup to the RTSMS 1062. Meanwhile, the stream caster 304 transmits a play acknowledgment to the media player 206 and streams the media to the media player.

When the media has been streamed, the media player 206 transmits a teardown message to the stream caster 304. The stream caster 304 transmits the SIB data for the teardown to the SRP 302. The SRP 302 builds the SIB for the teardown and transmits the SIB to the RTSMS 1062. In this example, a teardown acknowledgment is not transmitted from the stream caster 304 to the media player 206. It should be noted that viewing events may occur between the time a play acknowledgment is transmitted from the stream caster 304 to the media player 206, thereby starting the streaming of the media, and the time the teardown message is transmitted from the media player to the stream caster.

In this example, the setup message, the setup acknowledgement message, and the teardown message are transmitted between the media player 206 and the stream caster 304 out-of-band for broadband signaling. These messages are depicted as dashed lines in FIG. 5 for clarity.

In another example, two media clips are identified in the play list. For each media clip identified in the play list, the media player 206 goes through the process identified between the request for media message and the teardown message. Thus, the media player 206 requests the media, connects to an IP address of the selected stream caster, sets up a connection, requests that the media be played, and tears down the connection when the media streaming is complete. For the second media clip in the play list, the media player 206 again requests the media, sets up a connection to an IP address of a selected stream caster, requests that the media be played, and tears down the connection when the media streaming is complete.

In another example, the media player 206 sends an additional setup message to the same IP address on the stream caster 304, requests that the media be played, and tears down the session when the media streaming is complete. In this example, the media player 206 does not communicate with the NRP 108 after the first media clip is streamed to request an identification of an IP address of an MMS from which the second media clip will be streamed.

Figure 6:
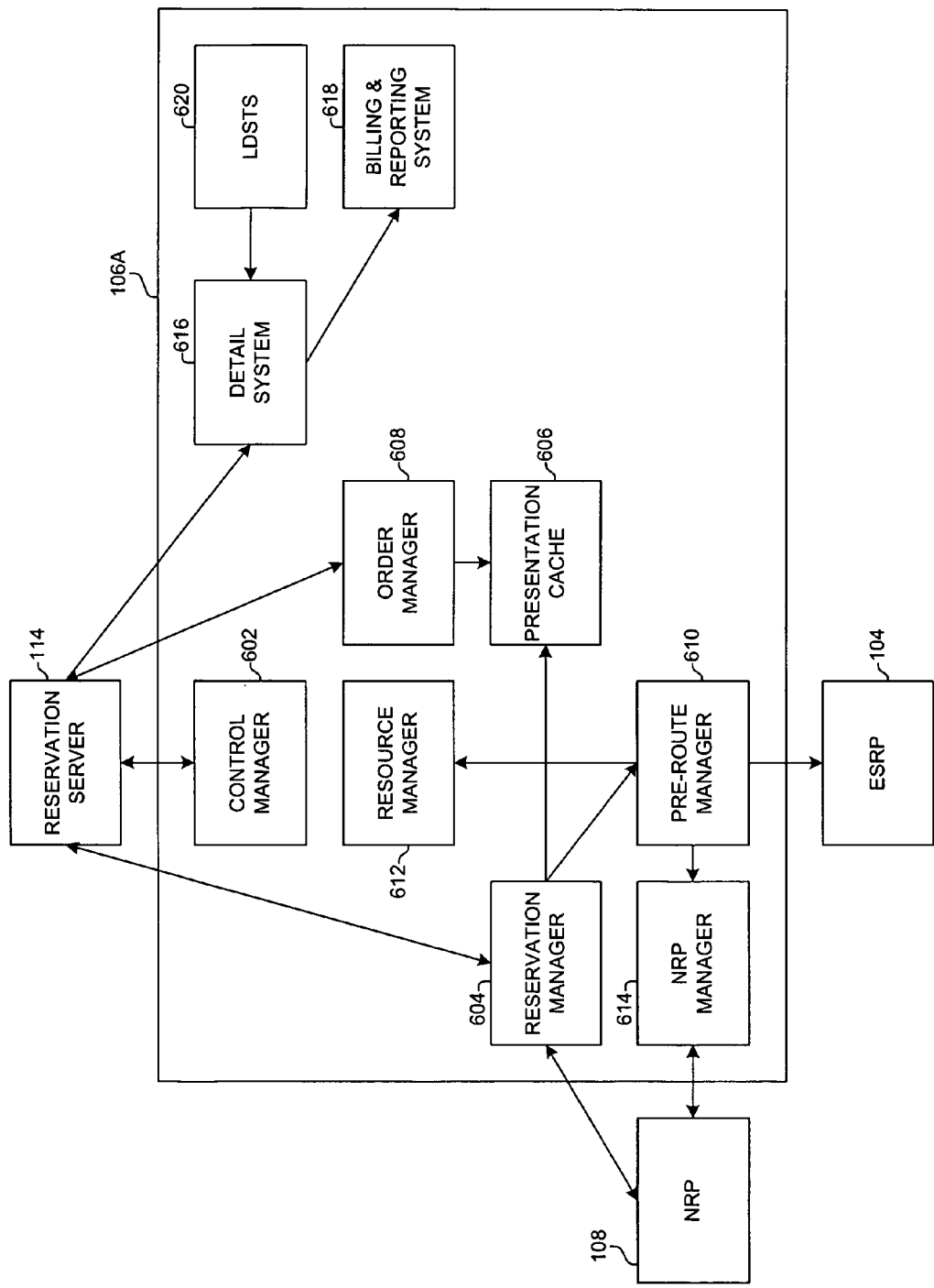
FIG. 6 is a block diagram of an expanded real time streaming management system in accordance with an embodiment of the present invention.

FIG. 6 depicts an exemplary embodiment of an RTSMS 106A of the present invention. The RTSMS of FIG. 6 comprises a control manager 602, a reservation manager 604, a presentation cache 606, an order manager 608, a pre-route manager 610, a resource manager 612, an NRP manager 614, and a detail system 616.

The control manager 602 monitors the status of each subsystem and device within the RTSMS 106A. The control manager 602 also monitors the transfer of messages between subsystems on the RTSMS 106A and the processing of the those messages by subsystems in the RTSMS. The control manager 602 generates an alarm upon detection of an error event.

The control manager 602 also operates security protocols to prevent unauthorized access to the RTSMS 106A. The control manager 602 authenticates reservation servers, portals, and other communication devices that attempt to access, or communicate with, the RTSMS 106A. The control manager 602 allows access and communication only from reservation servers, portals, and other communication devices that are authenticated.

The reservation manager 604 assigns a unique reservation identification, such as a number, for each requested media or requested presentation and publishes to the viewer the reservation. In one embodiment, the reservation comprises a play list that contains URLs each having the reservation identification. In this example, the URL also identifies a selected NRP. This reservation number serves to tie together the individual viewing experience to the actual media player involved, the stream caster and its associated events, and the customized presentation for the viewer. The reservation manager 604 tracks historical and current reservations that viewers have placed via the reservation server 114 or other portals.

The presentation cache 606 contains information identifying the presentations that currently are published and available for streaming. This information includes resource usage, such as bandwidth needed, processing needs, disk space used and required, and the length of time of the presentation. This information also includes the list of and the media clips in the presentation, any substitution rules for the presentation, the locations of the presentation in the streaming system 102, the publishing order and its associated rules, and the rating of the presentation. The substitution rules allow for different advertising media to be played based upon the data collected on the viewer throughout the reservation, routing, and initial session initiation processes. As described above, the publishing order specifies, among other things, the sequence that media is to be streamed.

The order manager 608 receives, stores, and monitors order information that is used for billing, crediting, and reporting. The order manager 608 also manages and controls access to presentations, including managing access restrictions, such as geographic or age restrictions.

The pre-route manager 610 determines which NRP can process a reservation based on resources available to the NRP, the switches communicating with that NRP, and where the presentations for the reservation are located. The pre-route manager 610 can reject a reservation request if an NRP or switch resources are not available, can schedule or reserve switch resources at the time the reservation request is processed or accepted, or bind the reservation to a selected NRP. If the pre-route manager 610 binds to reservation to a selected NRP, the pre-route manager pushes the reservation data to the selected NRP.

The resource manager 612 monitors and stores current usage of all resources in the streaming system 102, for current and future reservation requests, to determine whether a reservation should be accepted. These resources include switch capacity, stream caster capacity, media server capacity, and NRP status.

The NRP manager 614 monitors and stores the state of each NRP in the streaming system 102 and the communication links between the NRPs and the switches and the RTSMS. The NRP manager 614 also controls the updates to media routing tables and software and pushes scheduled changes to the NRPs at scheduled times.

The detail system 616 is a repository for the signaling records and logs, state model and state change data, operational measurements, and alarms that have occurred in the streaming system 102. The detail system 616 also holds the SIBs, the NRP logs, and the media server logs. The detail system 616 is fed by stream casters, media servers, SRPs, other communication devices in the MMSs, NRPs, and the RTSMS 106A itself.

The detail system 616 generates the billing and reporting records and the management alarms and events to the billing and reporting system 618. These records include the MSDRs that are created by using the reservation number to collate all of the important information from the SIB records, the reservation record, and the presentation records into one billable format.

The log data storage and transport subsystem (LDSTS) 620 is a generic utility provided on all devices. The LDSTS 620 manages safe storage of all events on the local device, monitors real time data transmissions for failures, alerts the RTSMS 106A of any errors, can allow for a historical pull of data upon communication or device failure, detects gaps in the event records, and detects duplicate records being received from a same device.

Figure 7:
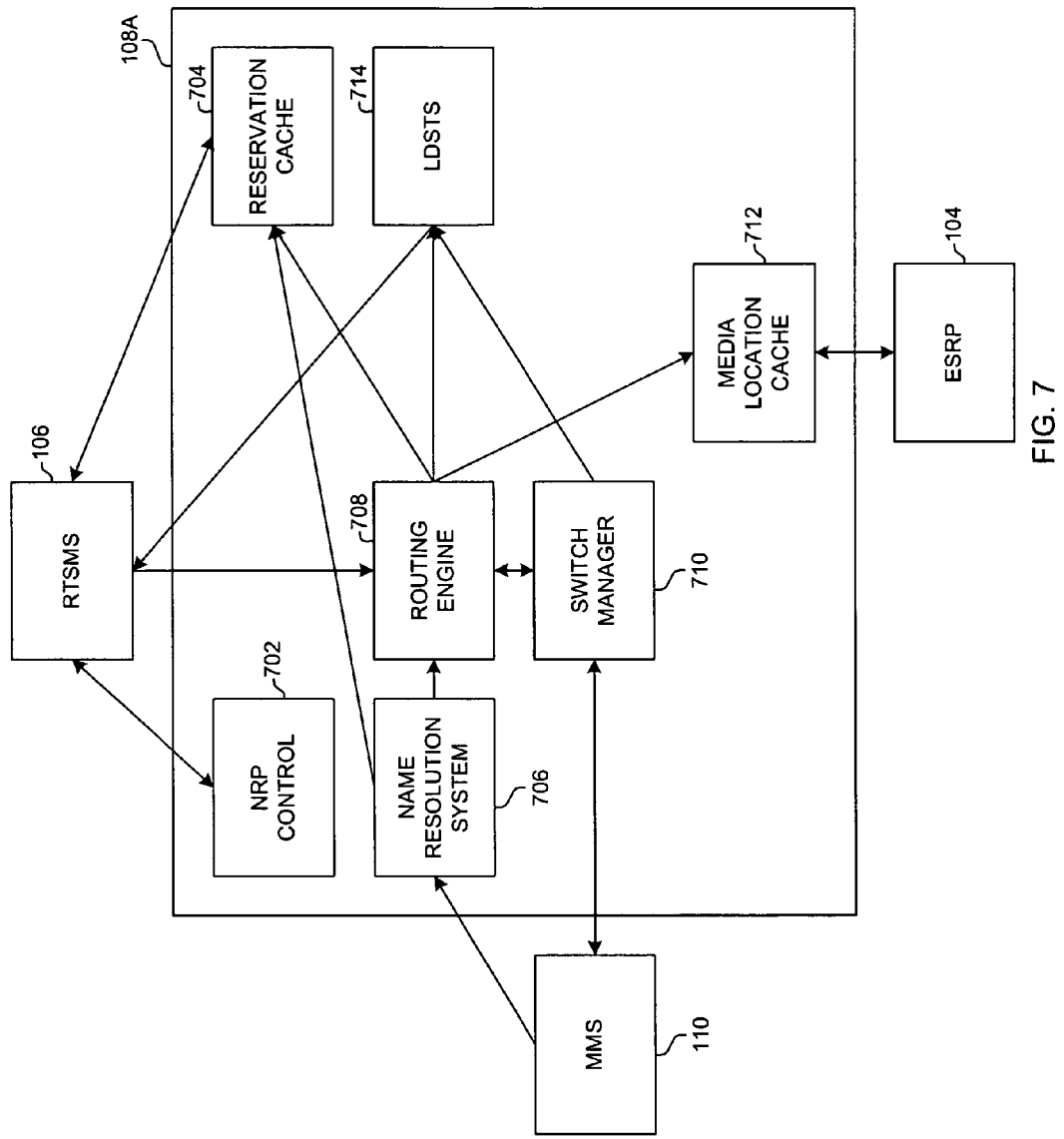
FIG. 7 is a block diagram of an expanded name routing processor in accordance with an embodiment of the present invention.

FIG. 7 depicts an exemplary embodiment of an NRP of the present invention. The NRP 108A of FIG. 7 comprises an NRP control manager 702, a reservation cache 704, a name resolution system 706, a routing engine 708, a switch manager 710, a media location cache 712, and an NRP LDSTS 714.

The NRP control manager 702 monitors and stores the events and the status of each subsystem and device within the NRP 108A. The control manager 702 also monitors the transfer of messages between subsystems on the NRP 108A and the processing of those messages by subsystems in the NRP. The control manager 702 generates an alarm upon detection of an error event. The control manager 702 also monitors and stores configuration changes made from a network operator or another source. The control manager 702 manages the NRP 108A at an aggregate level.

The control manager 702 maintains in memory the total bandwidth used by the NRP 108A, the total number of active requests, the current not to exceed bandwidth capacity, the current not to exceed active requests capacity, the current processing capacity, and the current not to exceed processing capacity. The memory enables the NRP 108A control manager 702 to reject name resolution request, such as a DNS lookup request or a broadband SIP connection request, when the name resolution request will place the NRP above the desired thresholds.

The reservation cache 704 maintains data identifying current and imminent reservations in the streaming system 102. The reservation data is used to feed the routing engine 708 and to validate whether a reservation exists.

The name resolution system 706 is the entry point to the routing engine 708. The name resolution system 706 receives the NRP identification signaling in a translatable protocol and provides the mapping back to replies. In one embodiment, the name resolution system 706 receives an NRP host name in a DNS protocol format as the NRP identification and, after the routing engine 708 has processed the request and an MMS that can provide the media is located, maps the response as an IP address to the MMS, or a stream caster on the MMS. The name resolution system 706 also resolves NRP identification requests from broadband communication devices.

The routing engine 708 determines whether to accept or to deny a request for media. If the routing engine 708 accepts the request, the routing engine determines the MMS that can provide the requested media. The routing engine 708 can reroute a media request. This can occur, for example, if the stream caster or its media server on an MMS fails or otherwise cannot begin or continue streaming the requested media. Other examples exist. The routing engine 708 collects additional information for a connection or a session based on how the connection or session is established over what initially is provided in the initial reservation. For example, if a viewer is connecting via a directly managed broadband network, the routing engine 708 collects detailed information on the actual logical virtual path/virtual circuit. The routing engine 708 can update reservation information or NRP logs with this additional information and have the updated information transferred to the RTSMS 106 for future use.

The switch manager 710 monitors and stores the state of the MMSs and their communication links. The switch manager 710 also transmits the reservation data to the MMSs, receives requests from an MMS to reroute a media stream, and responds to reroute requests.

The media location cache 712 caches presentation information, such as the identification of the media in a presentation, on what MMS devices the media is located, the anticipated streaming time of the media, the playing time of streamed media, the average bandwidth needed to stream media of a presentation, the maximum bandwidth needed to stream media of a presentation, and the quality of the media encoding. This presentation information is used by the routing engine 708 to make routing decisions.

The NRP LDSTS 714 collects event data, such as state change data and reservation data, from other subsystems of the NRP 108A. The LDSTS 714 transmits the event data, including NRP logs, to the RTSMS 106 for billing, reporting, and network management.

Figure 8:
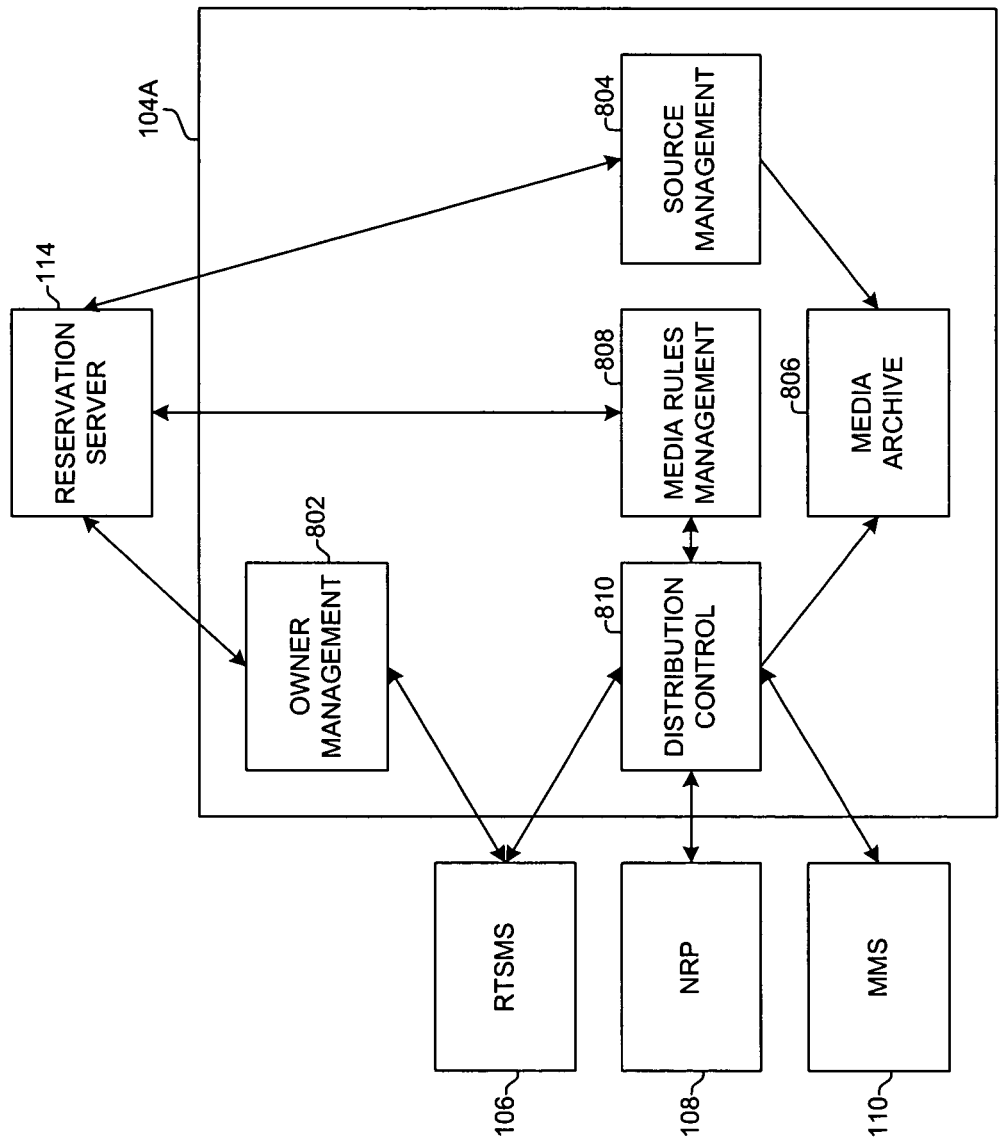
FIG. 8 is a block diagram of an expanded enhanced stream routing processor in accordance with an embodiment of the present invention.

FIG. 8 depicts an exemplary embodiment of an ESRP of the present invention. The ESRP 104A of FIG. 8 enables a media owner to encode media to selected formats and bit rates, establish media rules for media data rights, build presentations, establish orders having billing and access rights for the presentations, and make the presentations and their media available on the streaming system 102. The ESRP 104A comprises a media owner manager 802, a source manager 804, a media archive 806, a media rules manager 808, and a distribution controller 810.

The media owner manager 802 determines the access control and authorization rights of a media owner. The media owner manager 802 manages the process of building presentations and publishing them with the media rules and the order rules. The media owner manager 802 also stores any changes made by the media owner to any presentation or meta data for the associated media.

The source manager 804 tracks and stores information for the original source of the media before the media is encoded. This function particularly is important for events such as live events since the source manager 804 identifies the resources, such as ingress stream casters, needed for the event. Live events require special handling of the event source signal and transformation of that signal into media that can be distributed. The live event typically is redundantly encoded to ensure that a failure of any subsystem in the ESRP 104A does not impact the media being distributed. Ingress stream casters are media receivers that receive the media from an encoding device instead of a disk file.

The media archive 806 stores the encoded media. The media archive 806 may store the media according to an indexing function, such as a voice recognition function, a face recognition function, a text searching function, or another indexing function. Indexing functions enable the media to be searched, such as with a browser or a corresponding search mechanism, so that media can be located easily. Searches include both key word subject indexes that are text based and streaming media search capabilities that allow a portion of the media to be played.

The media rules manager 808 tracks the rights and rules associated with the media, including access rights, viewing rights, billing information, and billing order rules. The media rules manager 808 typically obtains information identifying the media from the media owner. The media owner is able to change meta data attached to media and have it distributed. The meta data is changed on the ESRP 104A and then cached to the RTSMS 106. When a reservation request arrives after the meta data for the media is changed, the new meta data is applied to the reservation request. The media rules manager 808 also records what meta data was altered for audit trail purposes.

The distribution controller 810 manages the distribution of presentations and media to appropriate MMSs. Media storage requirements can range from tens of megabytes to tens of gigabytes or more. The distribution controller 810 operates in conjunction with the mass storage of the MMS to migrate media to frequently used stream casters. The distribution controller 810 enables less frequently used digital media to be transmitted to an MMS on demand. The distribution controller 810 also uses caching algorithms to store or distribute frequently accessed media so that the media may be accessed with a high quality of service and at a high processing speed.

Those skilled in the art will appreciate the variations from the specific embodiments disclosed above are contemplated by the invention. The invention should not be restricted to the above embodiments, but should be measured by the following claims.

What is claimed is:

1. A system for streaming media to a viewer for a request for the media, the request having a reservation, and the system comprising:
a media switch state model generated by a media switch, the media switch state model comprising at least one state change for at least one state occurring for a session of streaming the media to at least one of a plurality of viewers, the at least one state change comprising at least one member selected from a group consisting of a session initiation state, a viewing event state, and a session termination state, each comprising a reservation identification for the reservation;

a routing processor state model generated by a routing processor, the routing processor state model comprising an identification of the media switch selected to stream the media and the reservation identification to the at least one of a plurality of viewers, wherein the media switch is selected based on at least one network distribution rule; and at least one processor to:
receive a routing processor identification and a reservation identification for the reservation, the routing processor identification identifying a routing processor to select a media switch to stream the media to at least one of a plurality of viewers, the routing processor selecting the media switch based on the at least one network distribution rule;
receive a media switch identification and the reservation identification for the reservation, the media switch identification identifying the media switch selected to stream the media; and
receive a state change identification and the reservation identification for the reservation, the state change identification identifying the at least one state change for the at least one state occurring for the session of streaming the media to the at least one of a plurality of viewers, wherein the session initiation state the viewing event state, and the session termination state each comprise a reservation identification for the reservation.

2. The system of claim 1 wherein the at least one member selected from the group consists of the session initiation state and the session termination state.

3. The system of claim 1 wherein the routing processor state model further comprises the session initiation state and the session termination state.

4. The system of claim 1 wherein the session comprises at least one member selected from another group consisting of an internet protocol session and a broadband connection.

5. The system of claim 1 wherein the reservation identification is appended with a universal resource locator.

6. The system of claim 1 wherein the network distribution rule comprises at least one member of a group comprising a capacity rule, a load rule, a bandwidth rule, a resource rule, and a session rule.

7. The system of claim 1 wherein the routing processor identification comprises an internet protocol address.

8. The system of claim 1 wherein the routing processor device is further configured to transmit an internet protocol address of the media switch selected to stream the media to the at least one of a plurality of viewers.

9. The system of claim 1 wherein the routing processor identification comprises a host name.

10. The system of claim 1 wherein the viewing event state comprises at least one member selected from another group consisting of a pause event, a stop event, a forward event, a cancel event, or a rewind event.

11. A method for streaming media to a viewer for a request for the media, the request having a reservation, and the method comprising:
generating a media switch state model by a media switch, the media switch state model comprising at least one state change for at least one state occurring for a session of streaming the media to at least one of a plurality of viewers, the at least one state change comprising at least one member selected from a group consisting of a session initiation state, a viewing event state, and a session termination state, each comprising a reservation identification for the reservation;

generating a routing processor state model by a routing processor, the routing processor state model comprising an identification of the media switch selected to stream the media and the reservation identification to the at least one of a plurality of viewers, wherein the media switch is selected based on at least one network distribution rule;

receiving, by at least one processor, a routing processor identification and a reservation identification for the reservation, the routing processor identification identifying a routing processor to select a media switch to stream the media to at least one of a plurality of viewers, the routing processor selecting the media switch based on the at least one network distribution rule;

receiving, by the at least one processor, a media switch identification and the reservation identification for the reservation, the media switch identification identifying the media switch selected to stream the media; and receiving, by the at least one processor, a state change identification and the reservation identification for the reservation, the state change identification identifying the at least one state change for the at least one state occurring for the session of streaming the media to the at least one of a plurality of viewers, wherein the session initiation state and the session termination state each comprise a reservation identification for the reservation.

12. The method of claim 11 wherein the at least one member selected from the group consists of the session initiation state and the session termination state.

13. The method of claim 11 wherein the viewing event state is selected from another group consisting of a pause event, a stop event, a forward event, a cancel event, or a rewind event.

14. The method of claim 11 wherein the session is selected from another group consisting of an internet protocol session and a broadband connection.

15. The method of claim 11 wherein the reservation identification is appended with a universal resource locator.

16. The method of claim 11 wherein the network distribution rule is selected from at least one member of a group comprising a capacity rule, a load rule, a bandwidth rule, a resource rule, and a session rule.

17. The method of claim 11 wherein the routing processor state model further comprises the session initiation state and the session termination state.

18. The method of claim 11 further comprising transmitting an internet protocol address of the media switch selected to stream the media to the at least one of the plurality of viewers.

19. The method of claim 11 wherein the routing processor identification comprises a host name.

20. The method of claim 11 wherein the routing processor identification comprises an internet protocol address.

* * * * *